(12) United States Patent
Lee

(10) Patent No.: US 12,481,396 B2
(45) Date of Patent: Nov. 25, 2025

(54) METHOD OF INSPECTING A TOUCH PANEL AND A DISPLAY DEVICE FOR INSPECTING A TOUCH PANEL

(71) Applicant: SAMSUNG DISPLAY CO., LTD., Yongin-si (KR)

(72) Inventor: Seung Rok Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/596,873

(22) Filed: Mar. 6, 2024

(65) Prior Publication Data
US 2024/0411405 A1    Dec. 12, 2024

(30) Foreign Application Priority Data

Jun. 12, 2023    (KR) ........................ 10-2023-0075174

(51) Int. Cl.
*G06F 3/041*    (2006.01)
*G01R 27/26*    (2006.01)
(Continued)

(52) U.S. Cl.
CPC ....... *G06F 3/0418* (2013.01); *G01R 27/2605* (2013.01); *G01R 31/2825* (2013.01);
(Continued)

(58) Field of Classification Search
CPC .... G06F 3/0418; G06F 3/0446; G06F 3/0443; G06F 3/0416; G06F 3/041662;
(Continued)

(56) References Cited

U.S. PATENT DOCUMENTS 8,279,197 B2    10/2012    Murphy et al.
8,519,722 B1 *   8/2013    Prendergast .......... G06F 3/0443
                                                   345/173

(Continued)

FOREIGN PATENT DOCUMENTS

| KR | 10-1935432 B1 | 1/2019 |
| KR | 10-2030635 B1 | 10/2019 |
| KR | 10-2528589 B1 | 5/2023 |

*Primary Examiner* — Adam R. Giesy
(74) *Attorney, Agent, or Firm* — F. CHAU & ASSOCIATES, LLC

(57) ABSTRACT

An inspection method including: determining first test correction capacitances using mutual capacitances of a first test boundary line channel of a test panel and a candidate coefficient; determining second test correction capacitances using mutual capacitances of a second test boundary line channel of the test panel and the candidate coefficient; determining test channel gaps of the first test boundary line channel using the first and second test correction capacitances; determining reference channel gaps based on mutual capacitances of a test non-boundary line channel; determining the candidate coefficient as a correction coefficient based on the reference and test channel gaps; determining first correction capacitances of a first boundary line channel of the touch panel; determining second correction capacitances of the second boundary line channel of the touch panel; determining channel gaps of the first boundary line channel using the first and second correction capacitances; and inspecting the first boundary line channel.

20 Claims, 22 Drawing Sheets

(51) Int. Cl.
*G01R 31/28* (2006.01)
*G01R 31/56* (2020.01)
*G06F 3/044* (2006.01)
*G01R 31/00* (2006.01)

(52) U.S. Cl.
CPC ......... *G01R 31/2837* (2013.01); *G01R 31/56* (2020.01); *G06F 3/0416* (2013.01); *G06F 3/041662* (2019.05); *G06F 3/044* (2013.01); *G06F 3/0443* (2019.05); *G06F 3/0446* (2019.05); *G01R 31/00* (2013.01)

(58) Field of Classification Search
CPC . G06F 3/044; G01R 27/2605; G01R 31/2825; G01R 31/56; G01R 31/00; G01R 31/2837; G01R 31/64; G01R 35/007
See application file for complete search history.

(56) References Cited

U.S. PATENT DOCUMENTS

| | | |
|---|---|---|
| 9,207,273 B2 | 12/2015 | Ko |
| 10,866,670 B2 | 12/2020 | Son |
| 2014/0354310 A1* | 12/2014 | Hargrove ................ G06F 3/044 324/750.01 |

* cited by examiner

|  | N9 | N8 | N7 | N6 | N5 | N4 | N3 | N2 | N1 |
|---|---|---|---|---|---|---|---|---|---|
| Cm(TBC1) | 1660 | 1640 | 1620 | 1600 | 1580 | 1560 | 1540 | 1520 | 1500 |
| Cm(TBC2) | 1550 | 1570 | 1590 | 1610 | 1630 | 1650 | 1670 | 1690 | 1710 |

FIG. 17

| CCF = 0.1 | N9 | N8 | N7 | N6 | N5 | N4 | N3 | N2 | N1 | TTP |
|---|---|---|---|---|---|---|---|---|---|---|
| TCCm1 | AV+TCD*4 | AV+TCD*3 | AV+TCD*2 | AV+TCD | AV | AV-TCD | AV-TCD*2 | AV-TCD*3 | AV-TCD*4 | |
| | 1588 | 1586 | 1584 | 1582 | 1580 | 1578 | 1576 | 1574 | 1572 | |
| TCCm2 | AV-TCD*4 | AV-TCD*3 | AV-TCD*2 | AV-TCD | AV | AV+TCD | AV+TCD*2 | AV+TCD*3 | AV+TCD*4 | |
| | 1622 | 1624 | 1626 | 1628 | 1630 | 1632 | 1634 | 1636 | 1638 | |

FIG. 18

| CCF = 0.1 | N8 | N7 | N6 | N5 | N4 | N3 | N2 | N1 | TTP |
|---|---|---|---|---|---|---|---|---|---|
| TCCm1 | AV+TCD*3.5 | AV+TCD*2.5 | AV+TCD*1.5 | AV+TCD*0.5 | AV-TCD*0.5 | AV-TCD*1.5 | AV-TCD*2.5 | AV-TCD*3.5 | |
| | 1594 | 1590 | 1586 | 1582 | 1578 | 1574 | 1570 | 1566 | |
| TCCm2 | AV-TCD*3.5 | AV-TCD*2.5 | AV-TCD*1.5 | AV-TCD*0.5 | AV+TCD*0.5 | AV+TCD*1.5 | AV+TCD*2.5 | AV+TCD*3.5 | |
| | 1616 | 1620 | 1624 | 1628 | 1632 | 1636 | 1640 | 1644 | |

FIG. 19

| CCF = 0.1 | N9 | N8 | N7 | N6 | N5 | N4 | N3 | N2 | N1 |
|---|---|---|---|---|---|---|---|---|---|
| TCCm1 | Cm(N5)+TCD*4 | Cm(N5)+TCD*3 | Cm(N5)+TCD*2 | Cm(N5)+TCD | --- | Cm(N5)−TCD | Cm(N5)−TCD*2 | Cm(N5)−TCD*3 | Cm(N5)−TCD*4 |
|  | 1588 | 1586 | 1584 | 1582 | 1580 | 1578 | 1576 | 1574 | 1572 |
| TCCm2 | Cm(N5)−TCD*4 | Cm(N5)−TCD*3 | Cm(N5)−TCD*2 | Cm(N5)−TCD | --- | Cm(N5)+TCD | Cm(N5)+TCD*2 | Cm(N5)+TCD*3 | Cm(N5)+TCD*4 |
|  | 1622 | 1624 | 1626 | 1628 | 1630 | 1632 | 1634 | 1636 | 1638 |

TTP

FIG. 20

TTP

| CCF | TCD | TCG(TBC1) | | |
|---|---|---|---|---|
| | | Avg | Max | Min |
| 0.1 | 2 | 3.17 | 4.20 | 2.14 |
| 0.2 | 4 | 3.17 | 5.24 | 1.13 |
| 0.3 | 6 | 3.21 | 6.30 | 0.37 |
| 0.4 | 8 | 3.43 | 7.36 | 0.50 |
| 0.5 | 10 | 3.77 | 8.44 | 0.62 |
| 0.6 | 12 | 4.24 | 9.53 | 0.75 |
| 0.7 | 14 | 4.72 | 10.63 | 0.87 |
| 0.8 | 16 | 5.19 | 11.74 | 0.99 |
| 0.9 | 18 | 5.72 | 12.86 | 1.13 |
| 1 | 20 | 6.28 | 14.00 | 1.25 |

CF → (0.1, 0.2, 0.3 rows)

| RCG(TNBC) | | |
|---|---|---|
| Avg | Max | Min |
| 3.27 | 4.76 | 2.37 |

FIG. 21

| CCF | TCD | TCG(TBC1) ||| 
|---|---|---|---|---|
| | | Avg | Max | Min |
| 0.1 | 2 | 3.17 | 4.20 | 2.14 |
| 0.2 | 4 | 3.17 | 5.24 | 1.13 |
| 0.3 | 6 | 3.21 | 6.30 | 0.37 |
| 0.4 | 8 | 3.43 | 7.36 | 0.50 |
| 0.5 | 10 | 3.77 | 8.44 | 0.62 |
| 0.6 | 12 | 4.24 | 9.53 | 0.75 |
| 0.7 | 14 | 4.72 | 10.63 | 0.87 |
| 0.8 | 16 | 5.19 | 11.74 | 0.99 |
| 0.9 | 18 | 5.72 | 12.86 | 1.13 |
| 1 | 20 | 6.28 | 14.00 | 1.25 |

| RCG(TNBC) |||
|---|---|---|
| Avg | Max | Min |
| 3.27 | 4.76 | 2.37 |

FIG. 22

| CF = 0.1 | N9 | N8 | N7 | N6 | N5 | N4 | N3 | N2 | N1 |
|---|---|---|---|---|---|---|---|---|---|
| Cm(BC1) | 1660 | 1640 | 1620 | 1600 | 1580 | 1560 | 1540 | 1520 | 1500 |
| Cm(BC2) | 1550 | 1570 | 1590 | 1610 | 1630 | 1650 | 1670 | 1690 | 1710 |
| ND(BC1) | 80 | 60 | 40 | 20 | 0 | −20 | −40 | −60 | −80 | Cm − Cm_Avg |
| ND(BC2) | −80 | −60 | −40 | −20 | 0 | 20 | 40 | 60 | 80 | Cm − Cm_Avg |
| CD(BC1) | 8 | 6 | 4 | 2 | 0 | −2 | −4 | −6 | −8 | ND * CF |
| CD(BC2) | −8 | −6 | −4 | −2 | 0 | 2 | 4 | 6 | 8 | ND * CF |
| CCm1 | 1588 | 1586 | 1584 | 1582 | 1580 | 1578 | 1576 | 1574 | 1572 | Cm_Avg + CD |
| CCm2 | 1622 | 1624 | 1626 | 1628 | 1630 | 1632 | 1634 | 1636 | 1638 | Cm_Avg + CD |
| CHG(BC1) | 2.14 | 2.40 | 2.65 | 2.91 | 3.16 | 3.42 | 3.68 | 3.94 | 4.20 |

METHOD OF INSPECTING A TOUCH PANEL AND A DISPLAY DEVICE FOR INSPECTING A TOUCH PANEL

CROSS-REFERENCE TO RELATED APPLICATION

This application claims priority under 35 U.S.C. § 119 to Korean Patent Application No. 10-2023-0075174, filed on Jun. 12, 2023, the disclosure of which is incorporated by reference herein in its entirety.

1. TECHNICAL FIELD

The present disclosure relates to a method of inspecting a touch panel and a display device for inspecting the touch panel.

2. DESCRIPTION OF THE RELATED ART

Electronic devices equipped with touch panels, which allow position indication through touch, are widely used. In particular, with the proliferation of mobile devices like smartphones and tablets, touch panels have become increasingly common.

The touch panel may include a touch electrode to detect touch inputs. If the touch electrode is shorted or open, the touch electrode might not accurately detect touch inputs. Therefore, to ensure precise touch input detection, a short or an open of the touch electrode may be required to be detected.

SUMMARY

An embodiment of the present disclosure provides a method of inspecting a touch panel for detecting an open of a boundary line channel.

Another embodiment of the present disclosure provides a display device for inspecting a touch panel.

According to an embodiment of the present disclosure, there is provided a method of inspecting a touch panel, the method including: determining first test correction capacitances based on mutual capacitances of a first test boundary line channel of a test touch panel and a candidate correction coefficient; determining second test correction capacitances based on mutual capacitances of a second test boundary line channel of the test touch panel and the candidate correction coefficient, wherein the second test boundary line channel is adjacent to the first test boundary line channel; determining test channel gaps of the first test boundary line channel based on the first test correction capacitances and the second test correction capacitances; determining reference channel gaps based on mutual capacitances of at least one of a plurality of test non-boundary line channels of the test touch panel; determining the candidate correction coefficient as a correction coefficient based on the reference channel gaps and the test channel gaps; determining first correction capacitances of a first boundary line channel of the touch panel based on mutual capacitances of the first boundary line channel and the correction coefficient, wherein the first boundary line channel corresponds to the first test boundary line channel; determining second correction capacitances of a second boundary line channel of the touch panel based on mutual capacitances of the second corresponds to the second test boundary line channel; determining channel gaps of the first boundary line channel based on the first correction capacitances and the second correction capacitances; and inspecting the first boundary line channel based on the channel gaps.

According to an embodiment of the present disclosure, there is provided a display device including: a touch panel including touch channels; a touch panel driver configured to drive the touch panel; a plurality of lines connected to a first portion of the touch channels in a first direction, connected to a second portion different from the first portion among the touch channels in a direction opposite to the first direction, and connecting the touch channels to the touch panel driver; and a touch panel inspector configured to inspect the touch panel, wherein the touch panel inspector determines first correction capacitances of a first boundary line channel, which is included in the first portion, based on mutual capacitances of the first boundary line channel and a correction coefficient, determines second correction capacitances of a second boundary line channel, which is included in the second portion and is adjacent to the first boundary line channel, based on mutual capacitances of the second boundary line channel and the correction coefficient, and determines channel gaps of the first boundary line channel based on the first correction capacitances and the second correction capacitances.

The method of inspecting the touch panel according to embodiments of the present disclosure may minimize a caustic defect for the boundary line channel by determining the channel gaps of the boundary line channel based on the correction capacitances of the boundary line channel.

BRIEF DESCRIPTION OF THE DRAWINGS

The above and other features of the present disclosure will become more apparent by describing in further detail embodiments thereof with reference to the accompanying drawings, in which:

FIG. 17 is a table illustrating an example of first test correction capacitances and second test correction capacitances according to the method of inspecting the touch panel of FIG. 13;

FIG. 18 is a table illustrating an example of the first test correction capacitances and the second test correction capacitances according to the method of inspecting the touch panel of FIG. 13;

FIG. 19 is a table illustrating first test correction capacitances and second test correction capacitances according to a method of inspecting a touch panel according to embodiments of the present disclosure;

FIG. 20 is a table illustrating an example of determining a correction coefficient according to the method of inspecting the touch panel of FIG. 13;

FIG. 21 is a table illustrating that a correction coefficient is determined according to a method of inspecting a touch panel according to embodiments of the present disclosure; and FIG. 22 is a table illustrating an example of determining channel gaps of a first boundary line channel according to the method of inspecting the touch panel of FIG. 13.

DETAILED DESCRIPTION OF THE EMBODIMENTS

Figure 1:
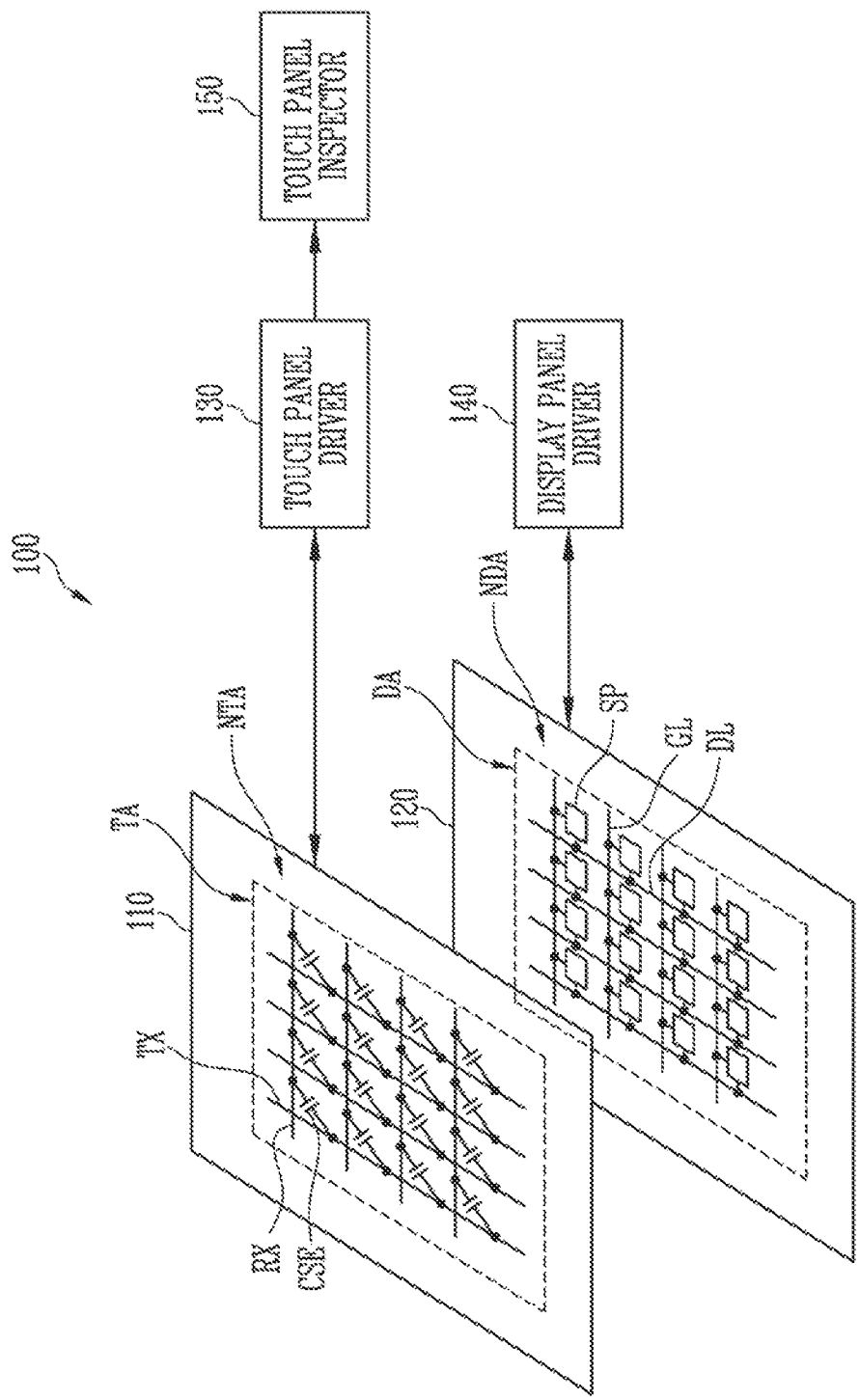
FIG. 1 is a diagram illustrating a display device according to embodiments of the present disclosure.

Hereinafter, embodiments of the present disclosure are described in detail with reference to the accompanying drawings. It is to be understood that the disclosure may be embodied in other forms without being limited to the embodiments described herein.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Throughout the specification, in a case where a certain portion "includes", means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Throughout the specification, terms such as first and second may be used to describe various components, but these components are not limited to these terms. These terms are used to distinguish one component from another component. Therefore, a first component may refer to a second component.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in a drawing is turned upside down, elements depicted as being positioned "under" other elements or features are positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to the specific shapes shown in the drawings, and should be interpreted as including, for example, changes in shapes that occur as a result of manufacturing. As described above, the shapes shown in the drawings may not show actual shapes of areas of a device, and the present disclosure is not limited thereto.

FIG. 1 is a diagram illustrating a display device 100 according to embodiments of the present disclosure.

Referring to FIG. 1, the display device 100 may include a touch panel 110, a display panel 120, a touch panel driver 130, a display panel driver 140, and a touch panel inspector 150.

In FIG. 1, the touch panel 110 and the display panel 120 are separated from each other. However, the touch panel 110 may be formed in a process separate from that of the display panel 120, and then, the touch panel 110 and the display panel 120 may be coupled to each other (for example, the touch panel 110 may be attached and coupled to one surface of the display panel 120). In other words, the touch panel 110 may be formed as an add-on type. Alternatively, the touch panel 110 and the display panel 120 may be formed in one process (for example, a process of manufacturing the display panel 120). In other words, the touch panel 110 may be formed in an in-cell type.

The touch panel 110 may be provided on one surface of the display panel 120. For example, the touch panel 110 may be disposed on one surface of the display panel 120 (for example, an upper surface) from which an image is emitted. In another embodiment, the touch panel 110 may be directly formed on one surface of the display panel 120 or may be formed inside the display panel 120. For example, the touch panel 110 may be directly formed on an outer surface of an upper substrate or a lower substrate of the display panel 120 (in other words, an upper surface of the upper substrate or a lower surface of the lower substrate). Additionally, the touch panel 110 may be directly formed on an inner surface of the upper surface (in other words, a lower surface of the upper substrate) or an inner surface of the lower substrate (in other words, an upper surface of the lower substrate).

The touch panel 110 may include a touch area TA capable of sensing touch, and a non-touch area NTA disposed outside the touch area TA (for example, a peripheral area or an edge area of the touch area TA). As an example, the non-touch area NTA may surround the touch area TA. In an embodiment, the touch area TA may be disposed to correspond to a display area DA of the display panel 120.

In an embodiment, the touch panel 110 may be disposed so that at least one area overlaps the display panel 120. For example, the touch area TA of the touch panel 110 may be disposed on the display area DA of the display panel 120. In an embodiment, at least one electrode for detecting touch may be disposed in the touch area TA. The at least one electrode for detecting touch may include a first touch electrode TX and a second touch electrode RX. The first touch electrode TX and the second touch electrode RX may be provided on the display area DA of the display panel 120.

Lines for electrically connecting the at least one electrode provided in the touch area TA to the touch panel driver 130 may be disposed in the non-touch area NTA. For example, lines for electrically connecting the first touch electrode TX and the second touch electrode RX to the touch panel driver 130 may be disposed in the non-touch area NTA. The non-touch area NTA may be disposed to correspond to a non-display area NDA of the display panel 120. In other words, the non-touch area NTA may overlap the non-display area NDA of the display panel 120.

The touch panel 110 may include at least one first touch electrode TX and second touch electrode RX provided in the touch area TA. For example, the touch panel 110 may include the first touch electrode TX and the second touch electrode RX crossing the first touch electrode TX. According to an embodiment, the first touch electrode TX may extend along a first direction, and the second touch electrode RX may extend along a second direction crossing the first direction while being insulated from the first touch electrode TX by an insulating layer. A capacitor CSE (or capacitance) is formed between the first touch electrode TX and the second touch electrode RX. The capacitance between the first touch electrode TX and the second touch electrode RX is changed when a touch occurs at a corresponding point or around the corresponding point. Accordingly, the touch panel driver 130 may sense the touch by detecting a change in the capacitance (in other words, a mutual capacitance) between the first touch electrode TX and the second touch electrode RX.

However, the present disclosure is not limited to a shape, a size, a disposition direction, and/or the like of the first touch electrode TX and the second touch electrode RX.

The display panel 120 includes the display area DA and the non-display area NDA positioned outside the display area DA (for example, an edge area or a peripheral area of the display area DA).

In the display area DA, a gate line GL and a data line DL are disposed, and a sub-pixel SP electrically connected to the gate line GL and the data line DL is disposed. In the non-display area NDA, lines for supplying various driving signals and/or power for driving the sub-pixels SP may be provided.

However, the present disclosure is not limited to a certain type of the display panel 120. For example, the display panel 120 may be a self-emissive display panel. For example, the display panel 120 may include a plurality of light emitting elements. For example, the light emitting element may be an organic light emitting diode (LED). For example, the light emitting element may be an inorganic LED such as a micro LED, or a quantum dot LED. For example, the light emitting element may be an element configured of a combination of an organic material and an inorganic material. For example, the display panel 120 may be a non-emissive display panel such as a liquid crystal display panel (LCD panel), an electro-phoretic display panel (EPD panel), or an electro-wetting display panel (EWD panel). When the display panel 120 is the non-emissive display panel, the display device 100 may further include a backlight unit for supplying light to the display panel 120.

The touch panel driver 130 may be connected to the touch panel 110 to transmit a signal to be input to the touch panel 110 or to receive a signal output from the touch panel 110. The touch panel driver 130 may detect the touch by supplying a touch driving signal to the touch panel 110 and then receiving a touch sensing signal corresponding to the touch driving signal from the touch panel 110. To accomplish this, the touch panel driver 130 may include a touch driving signal output unit and a touch sensing signal receiver. In an embodiment, the touch driving signal output unit and the touch sensing signal receiver may be integrated into one integrated circuit (IC), but the present disclosure is not limited thereto. In an embodiment, the touch panel driver 130 (for example, the touch driving signal output unit) may simultaneously (or sequentially) supply the touch driving signal to a plurality of first touch electrodes TX. The touch panel driver 130 (for example, the touch sensing signal receiver) may receive the touch sensing signal from the second sensing electrodes RX. The touch panel driver 130 may receive the touch sensing signal from the touch panel 110 and perform signal processing to detect whether the touch is input and/or a touch coordinate that corresponds to the location of the touch point on the touch panel 110.

The display panel driver 140 may be connected to the display panel 120 to supply a signal to be input to the display panel 120 or receive a signal output from the display panel 120. The display panel driver 140 may supply a gate signal to the gate line GL and supply a data voltage to the data line DL.

The touch panel inspector 150 may receive data on mutual capacitances from the touch panel driver 130 and detect whether the touch electrodes TX and RX are open based on the data. In other words, the touch panel inspector 150 can obtain data on mutual capacitances from the touch panel driver 130 and determine if the touch electrodes TX and RX are open based on this data.

Figure 2:
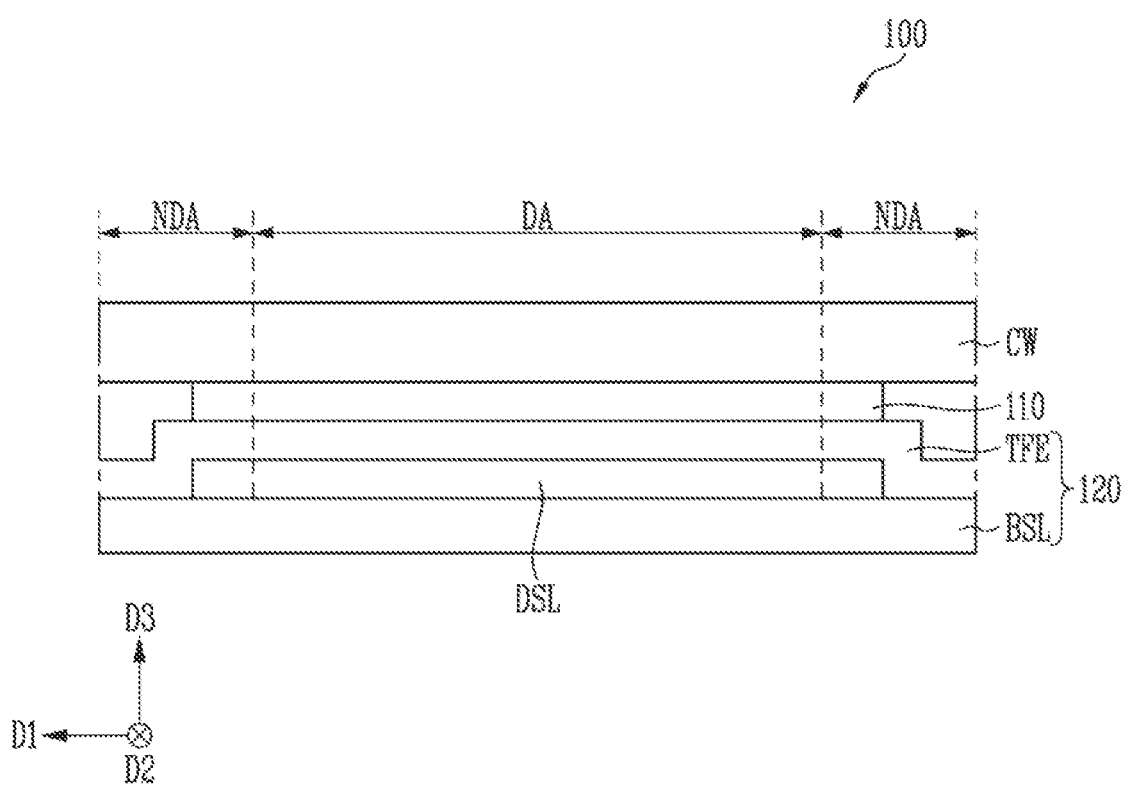
FIG. 2 is a cross-sectional view illustrating an example of the display device of FIG. 1.

FIG. 2 is a cross-sectional view illustrating an example of the display device 100 of FIG. 1.

Referring to FIG. 2, the display device 100 may include the display panel 120 and the touch panel 110 disposed on the display panel 120. A cover window CW may be disposed on the touch panel 110.

FIG. 2 illustrates that the display panel 120 is a self-emissive display panel including a light emitting element. However, the present disclosure is not limited to a type of display panel 120.

The display panel 120 may include a first base substrate BSL, an element layer DSL, an encapsulation layer TFE, and the like.

The first base substrate BSL may support the element layer DSL. The first base substrate BSL may include an insulating material. As an example of the insulating material, at least one of glass, quartz, ceramic, and plastic may be included. The first base substrate BSL may be a rigid substrate, and according to an embodiment, the first base substrate BSL may be a flexible substrate.

The element layer DSL may be positioned on the first base substrate BSL (for example, in a third direction D3). The element layer DSL may be in direct contact with the base substrate BSL. The element layer DSL may include the sub-pixel SP of FIG. 1 and a signal line positioned on the first base substrate BSL. The sub-pixel may include a thin film transistor (TFT) and a capacitor. In an embodiment, the sub-pixel may include the light emitting element electrically connected to the TFT and/or the capacitor. The signal line may include the gate line configured to transfer the gate signal to each sub-pixel and the data line configured to transfer the data voltage. The sub-pixel included in the element layer DSL may be positioned in the display area DA. A common electrode (for example, a cathode electrode of the light emitting element, a common electrode of the liquid crystal display device, or the like) may be formed in the element layer DSL.

The encapsulation layer TFE may be disposed on the element layer DSL. The encapsulation layer TFE may also be in direct contact with the first base substrate BSL. The encapsulation layer TFE may protect the element layer DSL from external moisture and/or oxygen. The encapsulation layer TFE may include two or more thin film layers formed on the element layer DSL. For example, the encapsulation layer TFE may include an inorganic thin film layer formed on the element layer DSL, an organic thin film layer formed on the inorganic thin film layer, and an inorganic thin film layer disposed on the organic thin film layer. In an embodiment, the encapsulation layer TFE may be formed of a glass substrate and may cover the element layer DSL. The encapsulation layer TFE may cover the element layer DSL in the display area DA and the non-display area NDA.

The touch panel 110 may be disposed on the encapsulation layer TFE. In an embodiment, the touch panel 110 may be formed directly on the encapsulation layer TFE. In an embodiment, the touch panel 110 may be formed through a process separate from that of the display panel 120 and may be disposed (for example, attached) on the encapsulation layer TFE. The touch panel 110 may have the touch area TA of FIG. 1 in at least a portion of an area overlapping the display area DA. The touch panel 110 may have the non-touch area NTA of FIG. 1 in at least a portion of an area overlapping the non-display area NDA.

The cover window CW may be disposed on the touch panel 110. The cover window CW may protect the display panel 120 and the touch panel 110 from external impact. The cover window CW may be implemented with a film of a light-transmitting (for example, transparent) material, for example, a glass and/or plastic material.

In an embodiment, the display device 100 may further include one or more optical layers (for example, an anti-glare layer, a polarizing plate, a color filter, liquid crystal, and the like).

Figure 3:
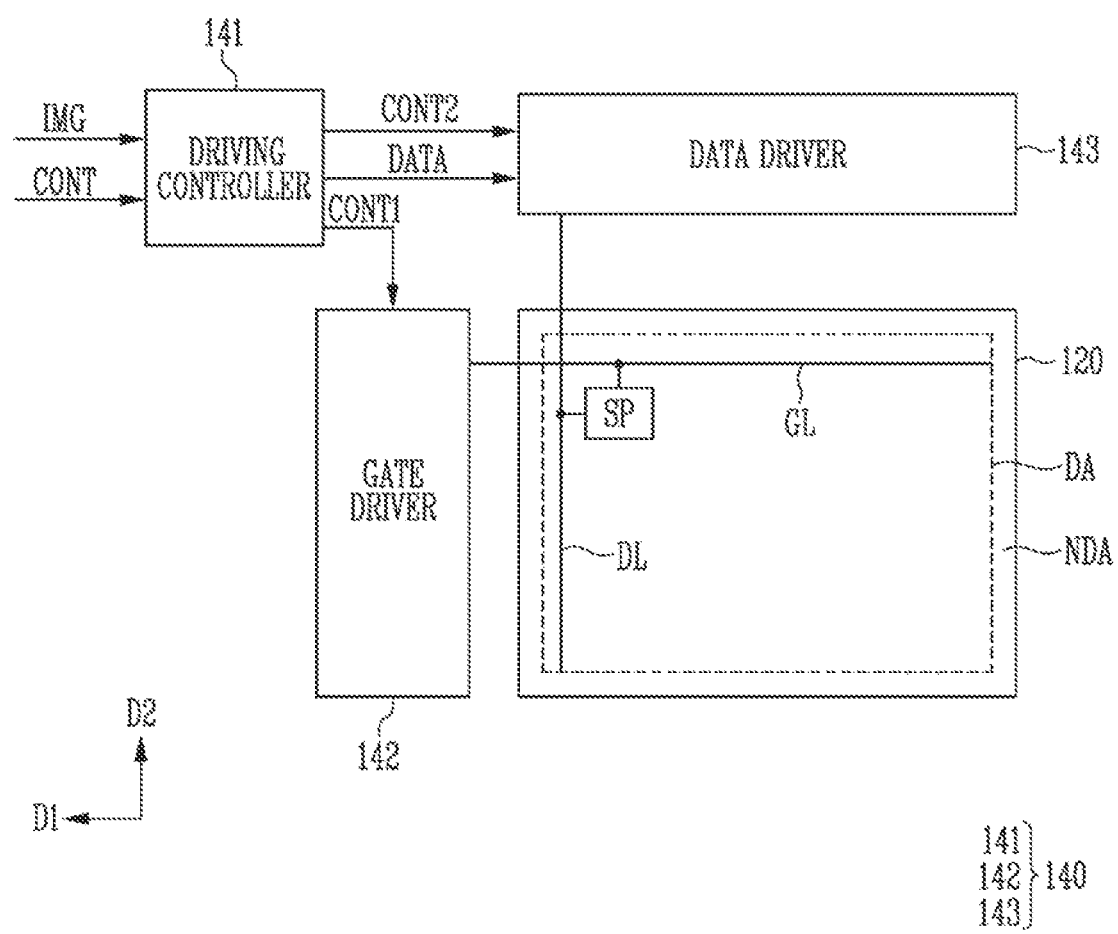
FIG. 3 is a block diagram illustrating an example of a display panel and a display panel driver of FIG. 1.

FIG. 3 is a block diagram illustrating an example of the display panel 120 and the display panel driver 140 of FIG. 1.

Referring to FIG. 3, the display device may include the display panel 120 and the display panel driver 140. The display panel driver 140 may include a driving controller 141, a gate driver 142, and a data driver 143. In an embodiment, the driving controller 141 and the data driver 143 may be integrated into one chip.

The display panel 120 may include the display area DA for displaying an image and the non-display area NDA disposed adjacent to the display area DA. In an embodiment, the gate driver 142 may be mounted on the non-display area NDA.

The display panel 120 may include a plurality of gate lines GL, a plurality of data lines DL, and a plurality of sub-pixels SP electrically connected to the gate lines GL and the data lines DL. The gate lines GL may extend in the first direction D1, and the data lines DL may extend in the second direction D2 crossing the first direction D1.

The driving controller 141 may receive input image data IMG and an input control signal CONT from a main processor (for example, a graphic processing unit (GPU) or the like). For example, the input image data IMG may include red image data, green image data, and blue image data. In an embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 141 may generate a first control signal CONT1, a second control signal CONT2, and a data signal DATA, based on the input image data IMG and the input control signal CONT.

The driving controller 141 may generate the first control signal CONT1 for controlling an operation of the gate driver 142 based on the input control signal CONT and output the first control signal CONT1 to the gate driver 142. The first control signal CONT1 may include a vertical start signal and a gate clock signal.

The driving controller 141 may generate the second control signal CONT2 for controlling an operation of the data driver 143 based on the input control signal CONT and output the second control signal CONT2 to the data driver 143. The second control signal CONT2 may include a horizontal start signal and a load signal.

The driving controller 141 may generate the data signal DATA by receiving the input image data IMG and the input control signal CONT. The driving controller 141 may output the data signal DATA to the data driver 143.

The gate driver 142 may generate gate signals for driving the gate lines GL in response to the first control signal CONT1 received from the driving controller 141. The gate driver 142 may output the gate signals to the gate lines GL. For example, the gate driver 142 may sequentially output the gate signals to the gate lines GL.

The data driver 143 may receive the second control signal CONT2 and the data signal DATA from the driving controller 141. The data driver 143 may generate data voltages obtained by converting the data signal DATA into an analog voltage. The data driver 143 may output the data voltages to the data line DL.

Figure 4:
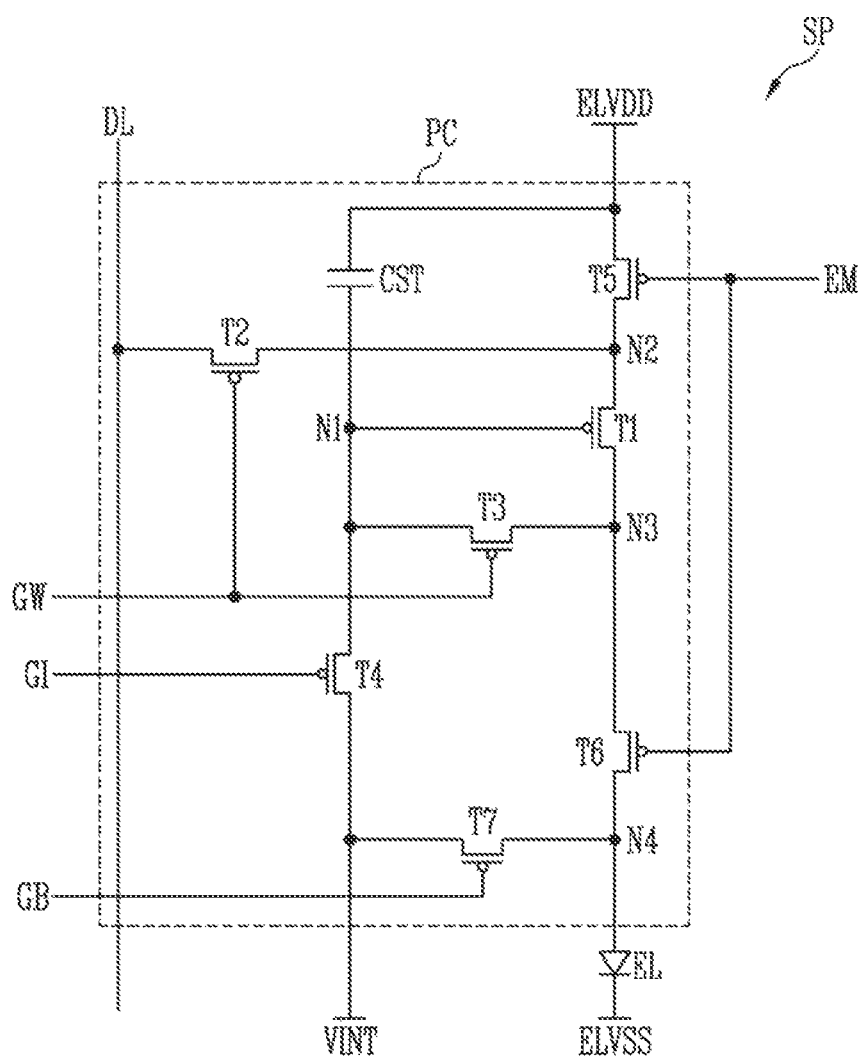
FIG. 4 is a circuit diagram illustrating an example of a sub-pixel of FIG. 3.

FIG. 4 is a circuit diagram illustrating an example of the sub-pixel SP of FIG. 3.

Referring to FIGS. 3 and 4, the sub-pixel SP may include a pixel driving circuit PC and a light emitting element EL. The pixel driving circuit PC may drive the light emitting element EL.

The pixel driving circuit PC may include a first transistor T1 including a control electrode (e.g., a gate electrode) connected to a first node N1, a first electrode connected to a second node N2, and a second electrode connected to a third node N3, a second transistor T2 including a control electrode for receiving a write gate signal GW, a first electrode connected to the data line DL, and a second electrode connected to the second node N2, a third transistor T3 including a control electrode for receiving the write gate signal GW, a first electrode connected to the third node N3, and a second electrode connected to the first node N1, a fourth transistor T4 including a control electrode for receiving an initialization gate signal GI, a first electrode for receiving an initialization voltage VINT, and a second electrode connected to the first node N1, a fifth transistor T5 including a control electrode for receiving an emission signal EM, a first electrode for receiving a first power voltage ELVDD (for example, a high power voltage), and a second electrode connected to the second node N2, a sixth transistor T6 including a control electrode for receiving the emission signal EM, a first electrode connected to the third node N3, and a second electrode connected to a fourth node N4, a seventh transistor T7 including a control electrode for receiving a bias gate signal GB, a first electrode for receiving the initialization voltage VINT, and a second electrode connected to the fourth node N4, and a storage capacitor CST including a first electrode for receiving the first power voltage ELVDD and a second electrode connected to the first node N1.

In an embodiment, the emission signal EM may be generated by the gate driver 142. In another embodiment, the emission signal EM may be generated by an emission driver separate from the gate driver 142.

Figure 5:
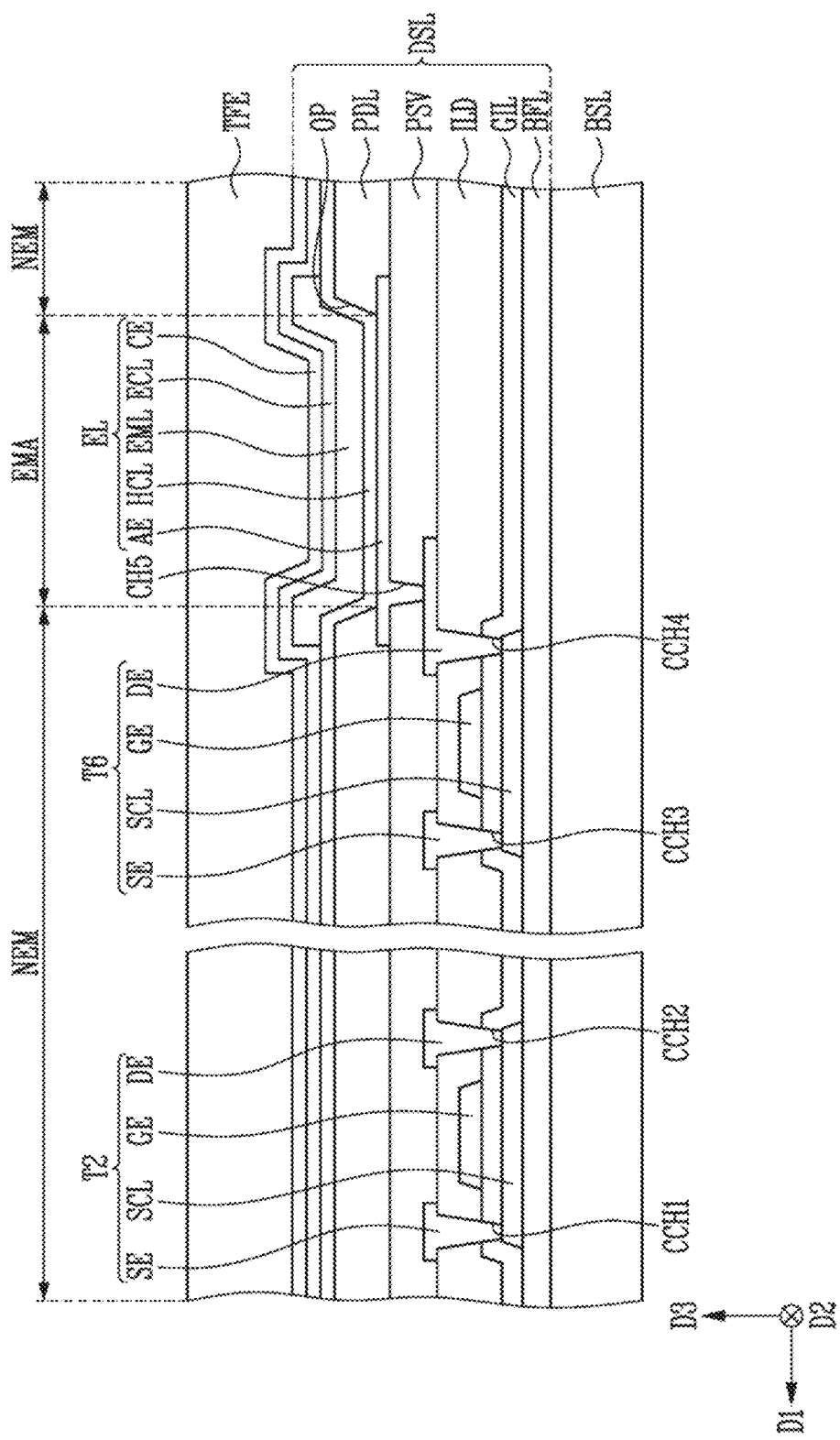
FIG. 5 is a cross-sectional view illustrating an enlarged example of an element layer of FIG. 2.

FIG. 5 is a cross-sectional view illustrating an enlarged example of the element layer DSL of FIG. 2.

In FIG. 5, transistors other than the second and sixth transistors T2 and T6 are omitted for convenience of description.

Referring to FIG. 5, the element layer DSL may include a buffer layer BFL, a gate insulating layer GIL, an interlayer insulating layer ILD, the transistors T2 and T6, a protective layer PSV, the light emitting element EL, and a pixel defining layer PDL.

The buffer layer BFL may be provided on the first base substrate BSL and may prevent an impurity from diffusing into the transistors T2 and T6. The buffer layer BFL may be provided as a single layer, but may also be provided as multiple layers of at least two or more layers. The buffer layer BFL may be omitted according to a material and a process condition of the first base substrate BSL.

Each of the transistors T2 and T6 may include a semiconductor layer SCL, a gate electrode GE, a source electrode SE, and a drain electrode DE.

The semiconductor layer SCL of each of the transistors T2 and T6 may be provided on the buffer layer BFL. The semiconductor layer SCL may include a source area and a drain area respectively contacting the source electrode SE and the drain electrode DE. An area between the source area and the drain area may be a channel area.

The semiconductor layer SCL may be a semiconductor pattern formed of polysilicon, amorphous silicon, an oxide semiconductor, or the like. The channel area may be an intrinsic semiconductor pattern that is not doped with an impurity. Here, an impurity such as an n-type impurity, a p-type impurity, and other metals may be used as the impurity. The source and drain areas may be semiconductor patterns doped with an impurity.

The gate electrode GE of each of the transistors T2 and T6 may be provided on the corresponding semiconductor layer SCL with the gate insulating layer GIL interposed therebetween.

The source electrode SE of each of the transistors T2 and T6 may contact the source area of the corresponding semiconductor layer SCL through a contact hole passing through the interlayer insulating layer ILD and the gate insulating layer GIL. For example, the source electrode SE of the second transistor T2 may contact the source area of the corresponding semiconductor layer SCL through a first contact hole CCH1 passing through the interlayer insulating layer ILD and the gate insulating layer GIL, and the source electrode SE of the sixth transistor T6 may contact the source area of the corresponding semiconductor layer SCL through a third contact hole CCH3 passing through the interlayer insulating layer ILD and the gate insulating layer GIL.

The drain electrode DE of each of the transistors T2 and T6 may contact the drain area of the corresponding semiconductor layer SCL through a contact hole passing through the interlayer insulating layer ILD and the gate insulating layer GIL. For example, the drain electrode DE of the second transistor T2 may contact the drain area of the corresponding semiconductor layer SCL through a second contact hole CCH2 passing through the interlayer insulating layer ILD and the gate insulating layer GIL, and the drain electrode DE of the sixth transistor T6 may contact the drain area of the corresponding semiconductor layer SCL through a fourth contact hole CCH4 passing through the interlayer insulating layer ILD and the gate insulating layer GIL.

In an embodiment, each of the interlayer insulating layer ILD and the gate insulating layer GIL may be formed of an inorganic insulating layer including an inorganic material or an organic insulating layer including an organic material.

The protective layer PSV may be provided on the transistors T2 and T6 and may cover the transistors T2 and T6. The protective layer PSV may include a fifth contact hole CH5 exposing a portion of the drain electrode DE of the sixth transistor T6 to an outside.

The element layer DSL may include the light emitting element EL that is provided on the protective layer PSV and emits light.

The light emitting element EL may include first and second electrodes AE and CE, and a light emitting layer EML provided between the two electrodes AE and CE. Here, any one of the first and second electrodes AE and CE may be an anode electrode, and the other may be a cathode electrode. For example, the first electrode AE may be the anode electrode and the second electrode CE may be the cathode electrode. When the light emitting element EL is a front surface emission type organic light emitting element, the first electrode AE may be a reflective electrode, and the second electrode CE may be a transmissive electrode. In an embodiment of the present disclosure, a case where the light emitting element EL is the front surface emission type organic light emitting element and the first electrode AE is the anode electrode is described as an example.

The first electrode AE may be electrically connected to the drain electrode DE of the sixth transistor T6 through the fifth contact hole CH5 passing through the protective layer PSV. The first electrode AE may include a reflective layer capable of reflecting light and a transparent conductive layer disposed on or under the reflective layer. At least one of the transparent conductive layer and the reflective layer may be electrically connected to the drain electrode DE of the sixth transistor T6.

The element layer DSL may further include the pixel defining layer PDL having an opening OP exposing a portion of the first electrode AE, for example, an upper surface of the first electrode AE.

Referring to FIGS. 3 and 5, each sub-pixel SP provided in the display panel 120 may be disposed in a pixel area included in the display area DA. In an embodiment, the pixel area may include an emission area EMA and a non-emission area NEM adjacent to the emission area EMA. The non-emission area NEM may surround the emission area EMA. In an embodiment, the emission area EMA may correspond to a partial area of the first electrode AE exposed by the opening OP.

The light emitting element EL may include a hole control layer HCL and an electron control layer ECL.

The hole control layer HCL may be commonly disposed in the emission area EMA and the non-emission area NEM. A common layer such as the hole control layer HCL may be commonly formed in the plurality of sub-pixels SP.

The light emitting layer EML may be disposed on the hole control layer HCL. The light emitting layer EML may be disposed in an area corresponding to the opening OP. In other words, the light emitting layer EML may be separately provided to each of the plurality of sub-pixels SP. The light emitting layer EML may include an organic material and/or an inorganic material. In an embodiment of the present disclosure, the patterned light emitting layer EML is shown as an example, but the light emitting layer EML may be commonly provided to the sub-pixels SP according to an embodiment. A color of light generated from the light emitting layer EML may be one of red, green, blue, and white, but is not limited thereto. For example, the color of the light generated from the light emitting layer EML may be one of magenta, cyan, and yellow.

The electron control layer ECL may be provided on the light emitting layer EML. In this configuration, the light emitting layer EML is disposed between the hole control layer HCL and the electron control layer ECL. The electron control layer ECL may be commonly formed in the sub-pixels SP, and may serve to inject and/or transport an electron to the light emitting layer EML.

The second electrode CE may be provided on the electron control layer ECL. The second electrode CE may be commonly provided to the sub-pixels SP.

The encapsulation layer TFE covering the second electrode CE may be provided on the second electrode CE.

The encapsulation layer TFE may be formed as a single layer, but may also be formed as multiple layers. The encapsulation layer TFE may include a plurality of insulating layers covering the light emitting element EL. For example, the encapsulation layer TFE may include at least one inorganic layer and at least one organic layer. For example, the encapsulation layer TFE may have a structure in which an inorganic layer and an organic layer are alternately stacked. According to an embodiment, the encapsulation layer TFE may be an encapsulation substrate disposed on the light emitting element EL and bonded to the first base substrate BSL through a sealant.

Figure 6:
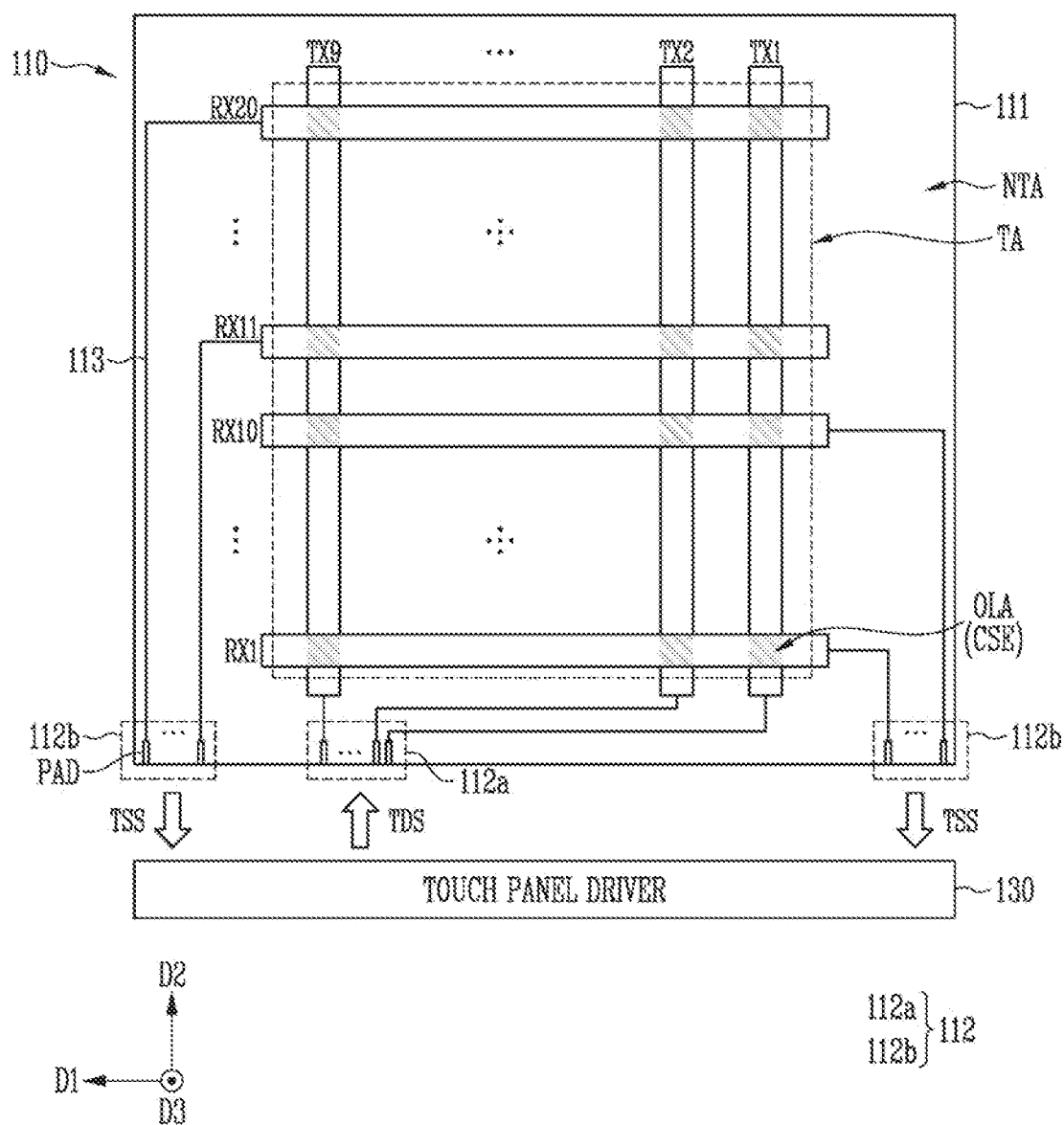
FIG. 6 is a block diagram illustrating an example of a touch panel of FIG. 1.

FIG. 6 is a block diagram illustrating an example of the touch panel 110 of FIG. 1.

Referring to FIG. 6, the touch panel 110 may include a second base substrate 111, first touch electrodes TX1 to TX9, second touch electrodes RX1 to RX20, a pad unit 112, and a line 113.

The second base substrate 111 may be a substrate that becomes a base of the touch panel 110, and may be a rigid or flexible substrate. For example, the second base substrate 111 may be a rigid substrate including glass or tempered glass, or a flexible substrate including a thin film of a flexible plastic material. The first touch electrodes TX1 to TX9, the second touch electrodes RX1 to RX20, the pad unit 112, the line 113, and the like may be disposed on the second base substrate 111. In an embodiment, the second base substrate 111 may be omitted (or replaced with another configuration). For example, when the first touch electrodes TX1 to TX9 and the second touch electrodes RX1 to RX20 are directly formed on the display panel 120 of FIG. 1, the second base substrate 111 may be replaced with the first base substrate BSL of FIG. 2 or the encapsulation layer TFE of FIG. 2 described above.

The first touch electrodes TX1 to TX9 may extend in the second direction D2. For example, each of the first touch electrodes TX1 to TX9 may extend in a column direction and may be disposed in the touch panel 110. The first touch electrodes TX1 to TX9 may be spaced apart from each other in the first direction D1.

The second touch electrodes RX1 to RX20 may extend along the first direction D1. For example, each of the second touch electrodes RX1 to RX20 may extend in a row direction and may be disposed in the touch panel 110. The second touch electrodes RX1 to RX20 may be spaced apart from each other in the second direction D2.

The touch panel 110 may be driven in a mutual capacitance method. In the mutual capacitance method, any one of the first touch electrodes TX1 to TX9 and the second touch electrodes RX1 to RX20 may function as a touch driving electrode, and the other may function as a touch sensing electrode. A touch driving signal TDS is input to the touch driving electrode, and a touch sensing signal TSS is output from the touch sensing electrode. In an embodiment, the first touch electrodes TX1 to TX9 may receive the touch driving signal TDS for touch driving, and the second touch electrodes RX1 to RX20 may output the touch sensing signal TSS corresponding to the touch driving signal TDS. In an embodiment, the second touch electrodes RX1 to RX20 may receive the touch driving signal TDS, and the first touch electrodes TX1 to TX9 may output the touch sensing signal TSS corresponding to the touch driving signal TDS. Hereinafter, for convenience of description, a case where the touch driving signal TDS is input to the first touch electrodes TX1 to TX9 and the second touch electrodes RX1 to RX20 output the touch sensing signal TSS is described as an example, but the present disclosure is not limited thereto.

The capacitor CSE may be formed between the first touch electrodes TX1 to TX9 and the second touch electrodes RX1 to RX20. For example, the capacitor CSE may be formed at areas where the first touch electrodes TX1 to TX9 overlap the second touch electrodes RX1 to RX20. The first touch electrodes TX1 to TX9 and the second touch electrodes RX1 to RX20 may overlap each other in a vertical direction (for example, the third direction D3 crossing the first direction D1 and the second direction D2) in an overlap area OLA. In the overlap area OLA, the first touch electrodes TX1 to TX9 may function as one side electrode of the capacitor CSE, and the second touch electrodes RX1 to RX20 may function as another side electrode of the capacitor CSE. The capacitor CSE may be formed between the first touch electrodes TX1 to TX9 and the second touch electrodes RX1 to RX20 in the overlap area OLA. When an object (for example, a human finger or the like) approaches the touch panel 110, the capacitance between the first touch electrode TX and the second touch electrode RX may change. The touch panel driver 130 of FIG. 1 may detect whether the touch is input and/or the touch coordinate based on this change in capacitance.

The pad unit 112 may include one or more pads PAD. The pad PAD may connect the first touch electrodes TX1 to TX9 and the second touch electrodes RX1 to RX20 to the touch panel driver 130 of FIG. 1. For example, the touch driving signal TDS may be input to the first touch electrodes TX1 to TX9 through a first pad unit 112a. For example, the touch sensing signal TSS may be output from the second touch electrodes RX1 to RX20 through a second pad unit 112b.

The line 113 may electrically connect the pad PAD and the first touch electrodes TX1 to TX9 or electrically connect the pad PAD and the second touch electrodes RX1 to RX20.

The pad unit 112 and the line 113 may be disposed in the non-touch area NTA.

In the present embodiment, the number of first touch electrodes TX1 to TX9 is nine and the number of second touch electrodes RX1 to RX20 is 20, but the present disclosure is not limited to nine first touch electrodes TX1 to TX9 and 20 second touch electrodes RX1 to RX20.

One touch electrode may be one touch channel. In an embodiment, one touch channel may correspond to one second touch electrode RX1 to RX20. In an embodiment, one touch channel may correspond to one first touch electrode TX1 to TX9. However, for convenience of description, FIGS. 14 to 22 illustrate that one touch channel corresponds to one second touch electrode RX1 to RX20. In addition, for convenience of description, FIGS. 14 to 22 illustrate that a portion crossing the first touch electrodes TX1 to TX9 in one touch channel corresponds to one node.

A first portion (for example, RX11 to RX20) of touch channels of the touch panel 110 may be connected to the lines 113 in the first direction D1, and a second portion (for example, RX1 to RX10) different from the first portion of the touch channels may be connected to the lines 113 in a direction opposite to the first direction D1.

Figure 7:
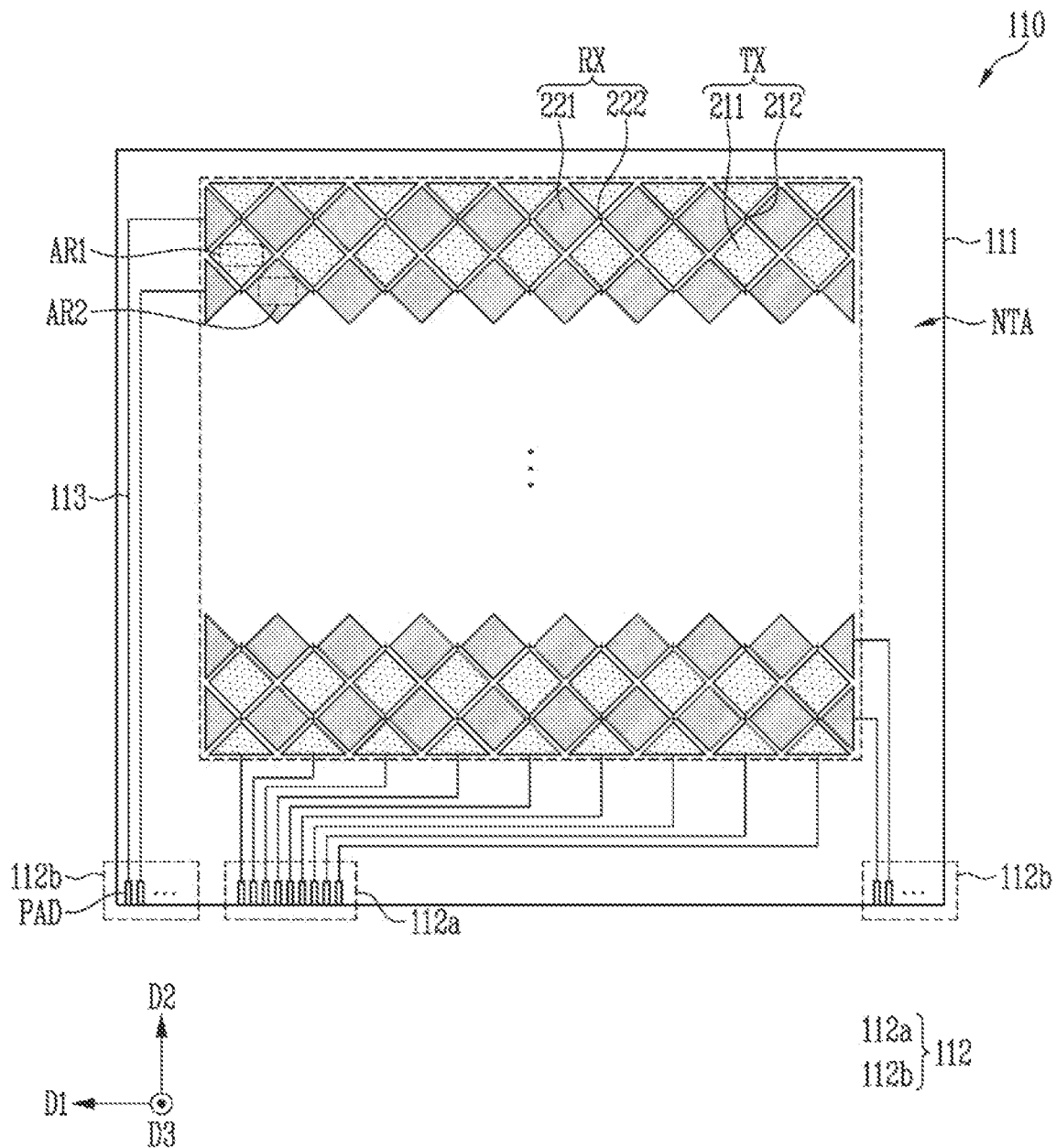
FIG. 7 is a diagram illustrating an example of a touch panel of FIG. 1.

FIG. 7 is a diagram illustrating an example of the touch panel 110 of FIG. 1.

The first touch electrode TX of the touch panel 110 may include a first sensing cell 211 and a first connection electrode 212. The second touch electrode RX may include a second sensing cell 221 and a second connection electrode 222.

The first touch electrode TX may extend along the column direction (for example, the second direction D2). The first touch electrodes TX disposed in each column may include a plurality of first sensing cells 211 and the first connection electrode 212 configured to connect the plurality of first sensing cells 211 to each other. In an embodiment, the first connection electrode 212 may be integrally configured with the first sensing cell 211. In an embodiment, the first connection electrode 212 may be configured in a bridge shape of connection pattern.

The second touch electrode RX may extend along the row direction (for example, the first direction D1). The second touch electrode RX disposed in each row may include a plurality of second sensing cells 221 and the second connection electrode 222 configured to connect the plurality of second sensing cells 221 to each other. In an embodiment, the second connection electrode 222 may be integrally configured with the second sensing cell 221. In an embodiment, the second connection electrode 222 may be configured in a bridge shape of connection pattern.

The first connection electrode 212 and the second connection electrode 222 may overlap each other in the vertical direction (for example, the third direction D3). The first connection electrode 212 and the second connection electrode 222 may be insulated from each other by an insulating layer.

The capacitor CSE may be formed between the first touch electrode TX and the second touch electrode RX. For example, the first touch electrode TX functions as one side electrode of the capacitor CSE, and the second touch electrode RX adjacent to the first touch electrode TX may functions as another side electrode of the capacitor CSE. The capacitor CSE may be formed in an adjacent area between the first touch electrode TX and the second touch electrode RX. Air (for example, atmosphere) between the first touch electrode TX and the second touch electrode RX may function as an insulating material of the capacitor CSE. Accordingly, whether the touch is input and/or the touch coordinate may be detected in the mutual capacitance method.

Figure 8:
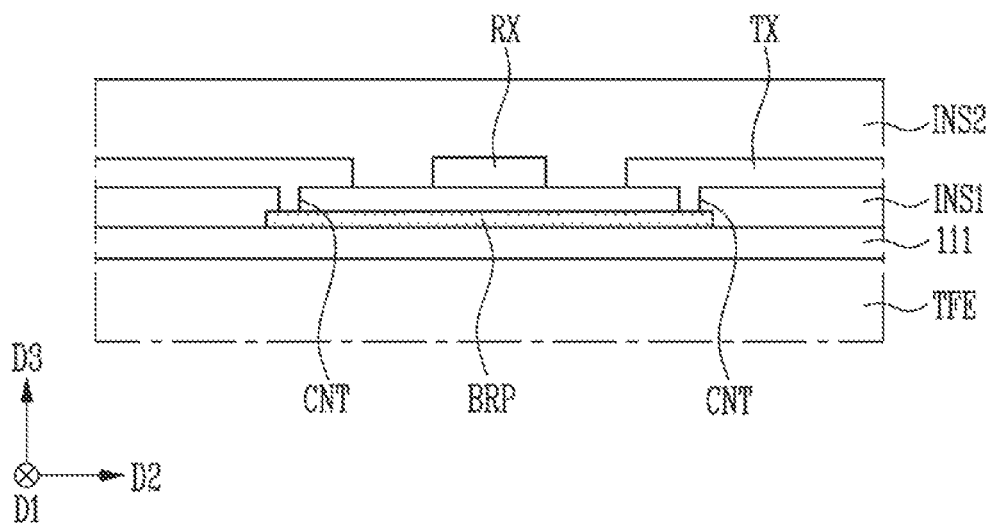
FIG. 8 is a cross-sectional view illustrating an example of a first touch electrode and a second touch electrode of FIG. 7.

FIG. 8 is a cross-sectional view illustrating an example of the first touch electrode TX and the second touch electrode RX of FIG. 7.

Referring to FIGS. 7 and 8, the touch panel 110 may include the first touch electrode TX, the second touch electrode RX, and a bridge pattern BRP.

The first touch electrodes TX may be arranged in the second direction D2 and electrically connected to adjacent first touch electrodes TX through the bridge pattern BRP to configure at least one sensor column. The second touch electrodes RX may be arranged in the first direction D1 crossing the second direction D2 and electrically connected to adjacent second touch electrodes RX through the bridge pattern BRP to configure at least one sensor row.

A first insulating layer INS1 may be provided on the second base substrate 111. The first insulating layer INS1 may include the same material as the second base substrate 111, but is not limited thereto. In an embodiment, the first insulating layer INS1 may include an organic insulating layer including an organic material or an inorganic insulating layer including an inorganic material. The first insulating layer INS1 may be provided between the bridge patterns BRP and the second touch electrodes RX.

The first touch electrodes TX may be electrically and/or physically connected to each other by the bridge patterns BRP through contact holes CNT passing through the first insulating layer INS1.

A second insulating layer INS2 may be provided on the first insulating layer INS1. The second insulating layer INS2 may prevent the first and second touch electrodes TX and RX from being exposed to the outside, thereby preventing corrosion of the first and second touch electrodes TX and RX. The second insulating layer INS2 may be formed of an organic insulating layer formed of an organic material. The organic material may include one of acryl, polyimide (PI), polyamide (PA), and benzocyclobutene (BCB). The second insulating layer INS2 formed of an organic insulating layer may be transparent and has fluidity, and thus, the second insulating layer INS2 may planarize a lower structure by alleviating a curvature of the lower structure. According to an embodiment, the second insulating layer INS2 may be formed of an inorganic insulating layer including an inorganic material.

Figure 9:
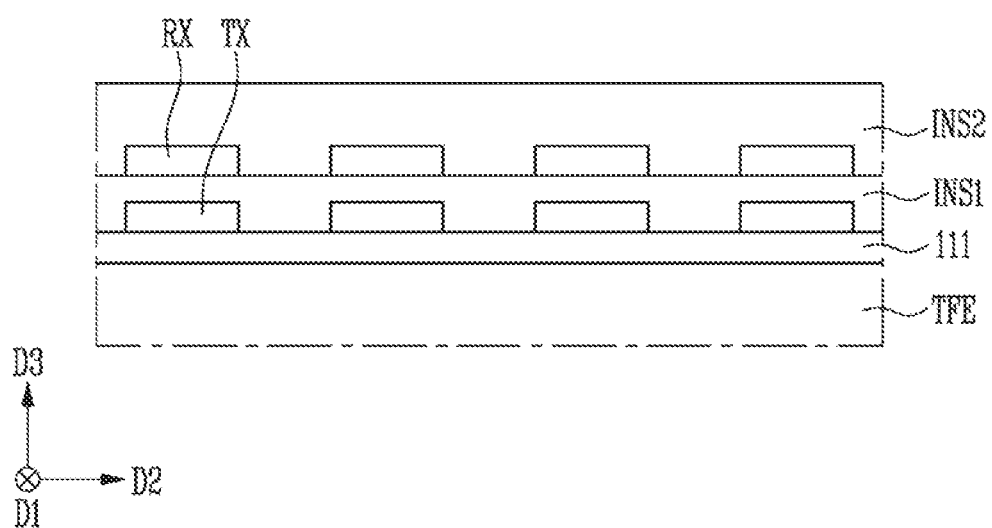
FIG. 9 is a cross-sectional view illustrating an example of the first touch electrode and the second touch electrode of FIG. 7.

FIG. 9 is a cross-sectional view illustrating an example of the first touch electrode TX and the second touch electrode RX of FIG. 7.

Referring to FIGS. 7 and 9, the first touch electrode TX and the second touch electrode RX may be disposed on different layers.

The first insulating layer INS1 may be provided on the second base substrate 111. The first touch electrodes TX may be provided on the second base substrate 111. The first insulating layer INS1 may prevent the first touch electrodes TX from being exposed to the outside, thereby preventing corrosion of the first touch electrodes TX. In an embodiment, the first insulating layer INS1 may include an organic insulating layer including an organic material or an inorganic insulating layer including an inorganic material.

The second insulating layer INS2 may be provided on the first insulating layer INS1. The second touch electrodes RX may be provided on the first insulating layer INS1. The second insulating layer INS2 may prevent the second touch electrodes RX from being exposed to the outside, thereby preventing corrosion of the second touch electrodes RX.

In the present embodiment, the first touch electrode TX is provided on the second base substrate 111 and the second touch electrode RX is provided on the first insulating layer INS1, but the disclosure is not limited thereto. For example, the second touch electrode RX may be provided on the second base substrate 111 and the first touch electrode TX may be provided on the first insulating layer INS1.

Figure 10A:
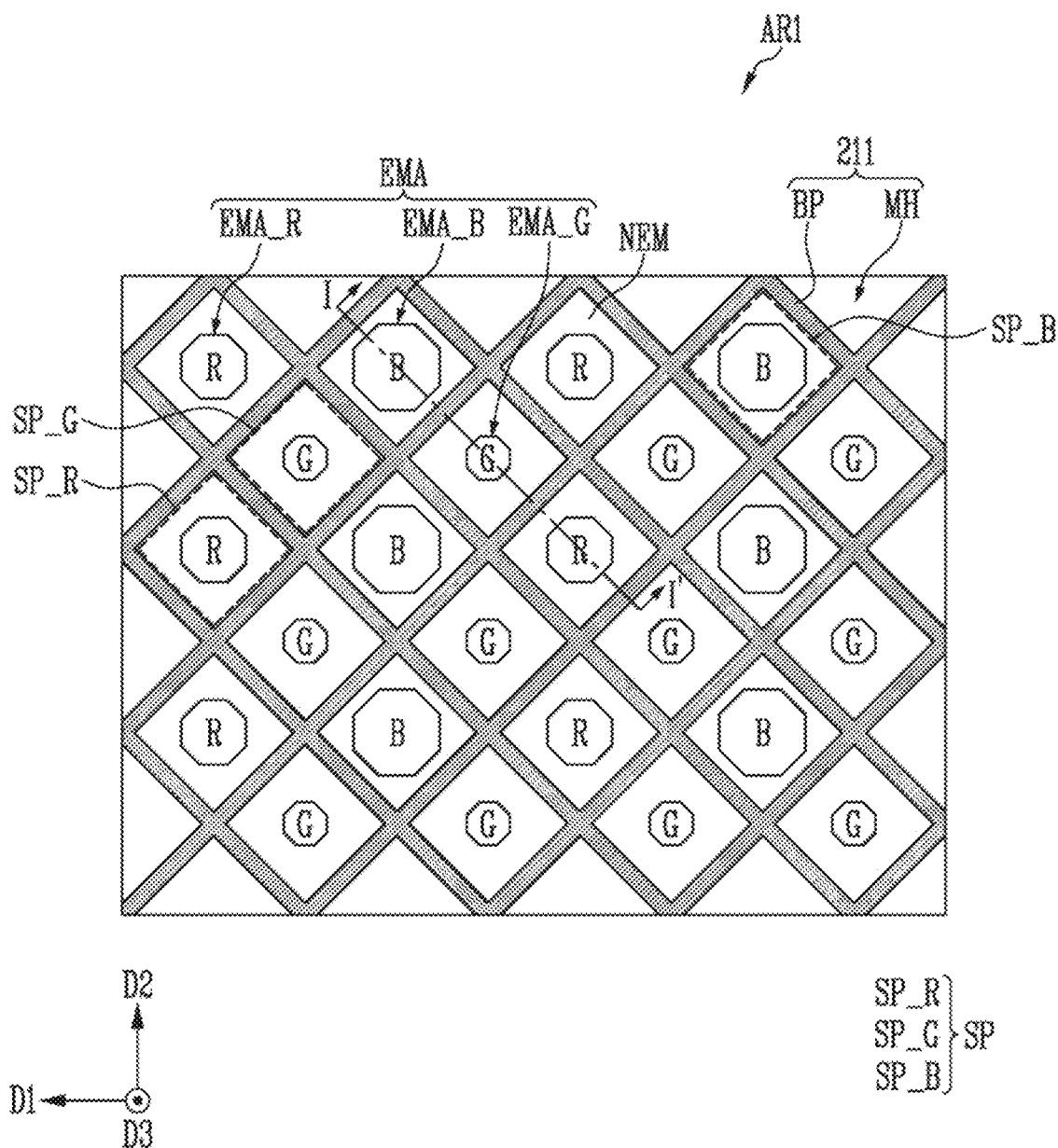
FIG. 10A is an enlarged view of a first area of FIG. 7.

FIG. 10A is an enlarged view of a first area AR1 of FIG. 7.

Each of the sub-pixels SP may include the emission area EMA and the non-emission area NEM. The sub-pixel SP may include a first sub-pixel SP_R, a second sub-pixel SP_G, and a third sub-pixel SP_B.

The emission area EMA is an area from which light may be emitted. For example, in an embodiment in which the sub-pixel SP includes the light emitting element, the emission area EMA may correspond to an area where the light emitting element is positioned.

The non-emission area NEM may be positioned around (for example, at an edge area) of the emission area EMA. The sub-pixels SP may be distinguished from each other by the non-emission area NEM. In an embodiment, a pixel driving circuit for driving the light emitting element may be positioned in at least a portion of an area overlapping the non-emission area NEM. In an embodiment, the non-emission area NEM may correspond to an area where a pixel defining layer, a black matrix, and the like are positioned. The emission area EMA and the non-emission area NEM may configure the display area DA of FIG. 1.

The first sub-pixel SP_R may emit light of a first wavelength band (for example, a red wavelength band). The second sub-pixel SP_G may emit light of a second wavelength band (for example, a green wavelength band). The third sub-pixel SP_B may emit light of a third wavelength band (for example, a blue wavelength band). The red wavelength band may be a wavelength band of approximately 600 nm to 750 nm, the green wavelength band may be a wavelength band of approximately 480 nm to 560 nm, and the blue wavelength band may be a wavelength band of approximately 370 nm to 460 nm.

For convenience of description, it is assumed that the first sub-pixel SP_R is a red sub-pixel emitting the light of the red wavelength band, the second sub-pixel SP_G is a green sub-pixel emitting the light of the green wavelength band, and the third sub-pixel SP_B is a blue sub-pixel emitting the light of the blue wavelength band, but the present disclosure is not limited thereto.

The sub-pixels SP may be arranged in various methods. For example, as shown in FIG. 10A, the first sub-pixel SP_R and the third sub-pixel SP_B may be alternately arranged along the row direction (for example, the first direction D1) and the second sub-pixel SP_G may be arranged along a row adjacent thereto. The second sub-pixel SP_G may be alternately disposed with the first sub-pixel SP_R and the third sub-pixel SP_B.

The area of the emission area EMA of any one of the first sub-pixel SP_R, the second sub-pixel SP_G, and the third sub-pixel SP_B may be different from that of the other two. For example, the area of the emission area EMA_B of the third sub-pixel SP_B may be greater than the area of the emission area EMA_R of the first sub-pixel SP_R. For example, the area of the emission area EMA_R of the first sub-pixel SP_R may be greater than the area of the emission area EMA_G of the second sub-pixel SP_G. However, the present disclosure is not limited thereto. For example, all areas of the emission areas EMA of the first sub-pixel SP_R, the second sub-pixel SP_G, and the third sub-pixel SP_B may be the same.

A shape of the emission area EMA may be variously designed. For example, referring to FIG. 10A, the shape of the emission area EMA may be octagonal, but the emission area EMA may have a shape such as a circular shape, another polygonal shape, or a polygonal shape in which a corner is rounded.

The first touch electrode TX (e.g., the first sensing cell 211 of the first touch electrode TX) may include a mesh hole MH and a body portion BP.

The mesh hole MH may overlap the emission area EMA in a thickness direction (for example, the third direction D3). The emission area EMA may be positioned in an area corresponding to the mesh hole MH. The area of the mesh hole MH may be greater than the area of the emission area EMA.

The body portion BP may overlap the non-emission area NEM in the thickness direction (for example, the third direction D3). A width of the body portion BP may be less than a width of the non-emission area NEM.

Through the structure described above, light output from the emission area EMA of the sub-pixel SP may effectively pass through the first touch electrode TX.

Figure 10B:
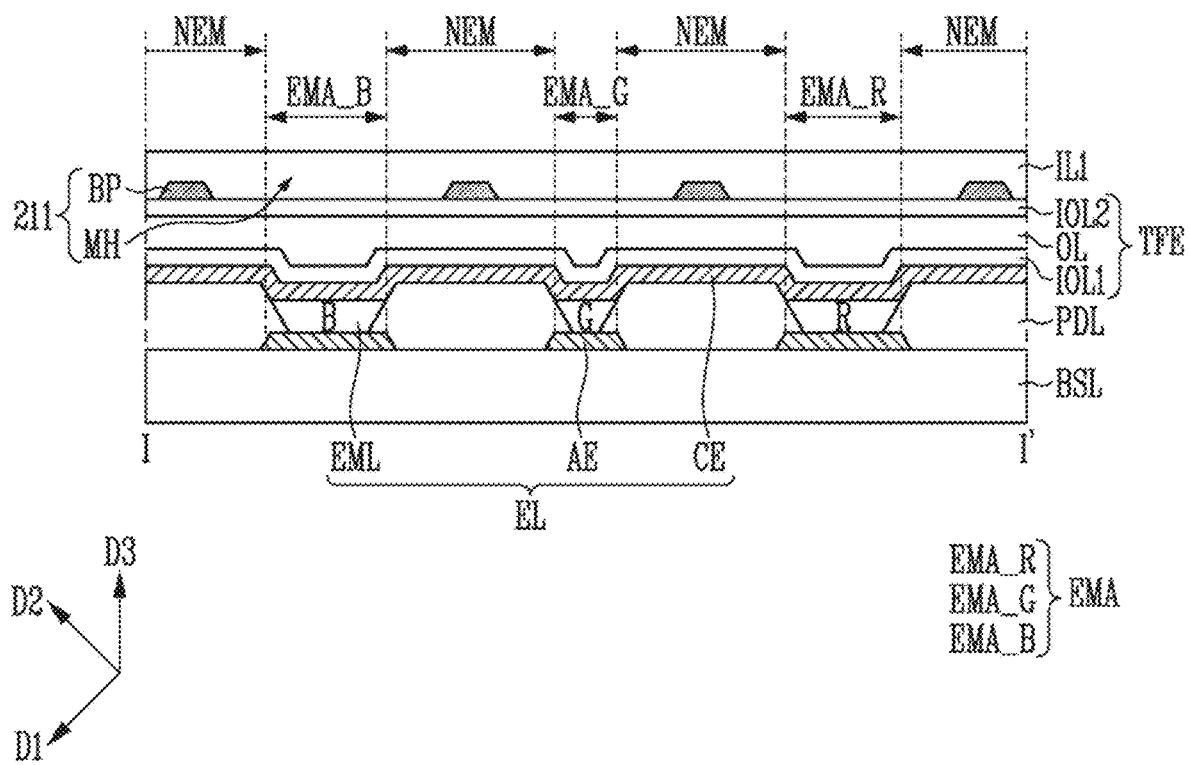
FIG. 10B is a cross-sectional view taken along a line I-I' of FIG. 10A.

FIG. 10B is a cross-sectional view taken along a line I-I' of FIG. 10A.

Referring to FIG. 10B, the pixel defining layer PDL, the light emitting element EL, the encapsulation layer TFE, the first sensing cell 211, and a first insulating layer IL1 may be positioned on the first base substrate BSL. The pixel defining layer PDL and the light emitting element LE may be included in the above-described element layer DSL of FIG. 2. The first sensing cell 211 and the first insulating layer IL1 may be included in the above-described touch panel 110 of FIG. 2.

The light emitting element LE may include the first electrode AE, the second electrode CE, and the light emitting layer EML. The light emitting layer EML is positioned between the first electrode AE and the second electrode CE. The light emitting element LE may be disposed in each sub-pixel SP.

The first electrode AE may be disposed in each sub-pixel SP. The pixel defining layer PDL exposing the first electrode AE may be disposed on the first electrode AE. The first electrode AE may correspond to the anode electrode of the light emitting element EL. The first electrode AE may include silver (Ag), magnesium (Mg), aluminum (Al), platinum (Pt), palladium (Pd), gold (Au), nickel (Ni), neodymium (Nd), iridium (Ir), chromium (Cr), a metal layer such as an alloy thereof, indium tin oxide (ITO), indium zinc oxide (IZO), zinc oxide (ZnO), indium tin zinc oxide (ITZO), and/or the like.

The pixel defining layer PDL may overlap the non-emission area NEM. The pixel defining layer PDL may include an organic insulating layer including an organic material. As the organic material, one or more of acryl resin, epoxy resin, phenolic resin, polyamide resin, and polyimide resin may be selected. The pixel defining layer PDL may include a light absorbing material. The pixel defining layer PDL may be coated with a light absorber and may absorb light introduced from the outside. For example, the pixel defining layer PDL may include a carbon-based black pigment. However, the present disclosure is not limited thereto, and the pixel defining layer PDL may include an opaque metal material such as chromium (Cr), molybdenum (Mo), an alloy of molybdenum and titanium (MoTi), tungsten (W), vanadium (V), niobium (Nb), tantalum (Ta), manganese (Mn), cobalt (Co), or nickel (Ni).

The light emitting layer EML may overlap an area where at least a portion of the pixel defining layer PDL is removed to expose the first electrode AE. The light emitting layer EML may include an organic light emitting layer. According to the organic material included in the light emitting layer EML, the light emitting layer EML may emit the light of the first wavelength band (for example, the red wavelength band), emit the light of the second wavelength band (for example, the green wavelength band), or may emit the light of the third wavelength band (for example, the blue wavelength band).

The second electrode CE may be disposed on the light emitting layer EML (for example, in the third direction D3). The second electrode CE may be entirely formed in the emission area EMA and the non-emission area NEM. The second electrode CE may correspond to the cathode electrode of the light emitting element LE. The second electrode CE may include a metal layer such as silver (Ag), magnesium (Mg), aluminum (Al), platinum (Pt), palladium (Pd), gold (Au), nickel (Ni), neodymium (Nd), iridium (Ir), chromium (Cr), and/or a light transmitting conductive layer such as ITO, IZO, ZnO, or ITZO. For example, the second electrode CE may be formed as multiple layers of double or more layers including a thin metal layer. For example, the second electrode CE may include triple layers of ITO/Ag/ITO.

In an embodiment, the light emitting element LE may further include a hole transport layer disposed between the first electrode AE and the light emitting layer EML, and an electron transport layer disposed between the second electrode CE and the light emitting layer EML.

The encapsulation layer TFE may be positioned on the second electrode CE (for example, in the third direction D3). The encapsulation layer TFE may have a stack structure in which an inorganic material, an organic material, and an inorganic material are sequentially formed. Referring to FIG. 10B, the encapsulation layer TFE may be formed by sequentially forming a first inorganic encapsulation layer IOL1 including an inorganic material, an organic encapsulation layer OL including an organic material, and an inorganic encapsulation layer IOL2 including an inorganic material. The encapsulation layer TFE may protect the lower light emitting element EL (for example, the light emitting layer EML) from external moisture and/or oxygen.

The body portion BP of the first sensing cell 211 may be disposed on the encapsulation layer TFE. The first insulating layer IL1 is positioned on the first body portion BP.

Referring to FIGS. 6 and 10B, the first insulating layer IL1 may insulate the touch electrodes from each other. The first touch electrodes TX1 to TX9 may be insulated from each other by the first insulating layer IL1. The second touch electrodes RX1 to RX20 may be insulated from each other by the first insulating layer IL1.

Referring to FIGS. 7 and 10B, the first connection electrode 212 and the second connection electrode 222 may be insulated by the first insulating layer IL1. For example, the first connection electrode 212 and the second connection electrode 222 may overlap each other in the thickness direction (for example, the third direction D3) with the first insulating layer IL1 interposed therebetween.

The mesh hole MH of the first sensing cell 211 may overlap the emission area EMA.

Figure 11A:
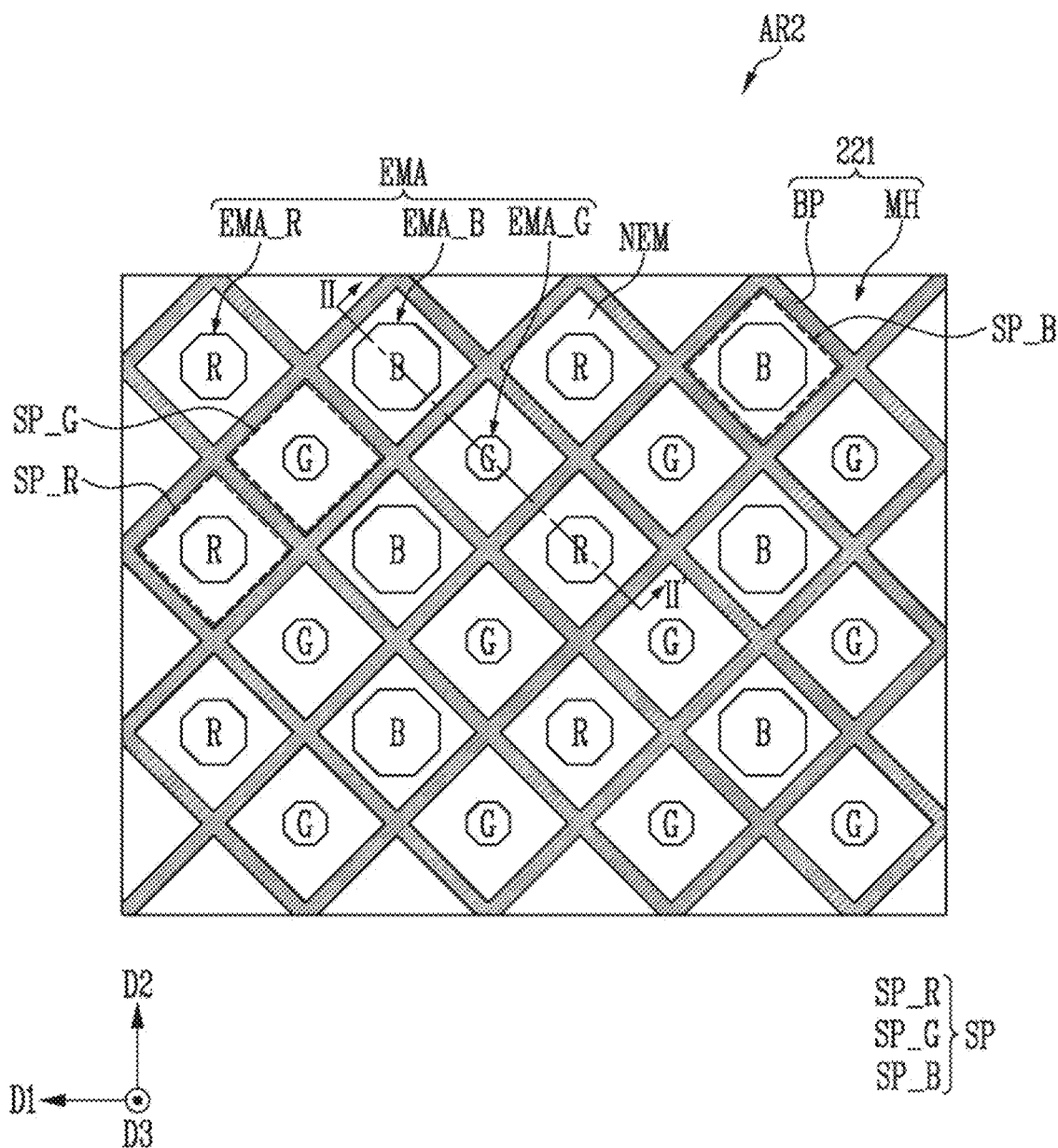
FIG. 11A is an enlarged view of a second area of FIG. 7.

FIG. 11A is an enlarged view of a second area AR2 of FIG. 7.

Referring to FIGS. 10A and 11A, a description of the first sensing cell 211 may be applied to a description of the second sensing cell 221 as a whole. The second sensing cell 221 may include the body portion BP and the mesh hole MH. A description of remaining configurations is the same as that described above with reference to FIG. 10A.

Figure 11B:
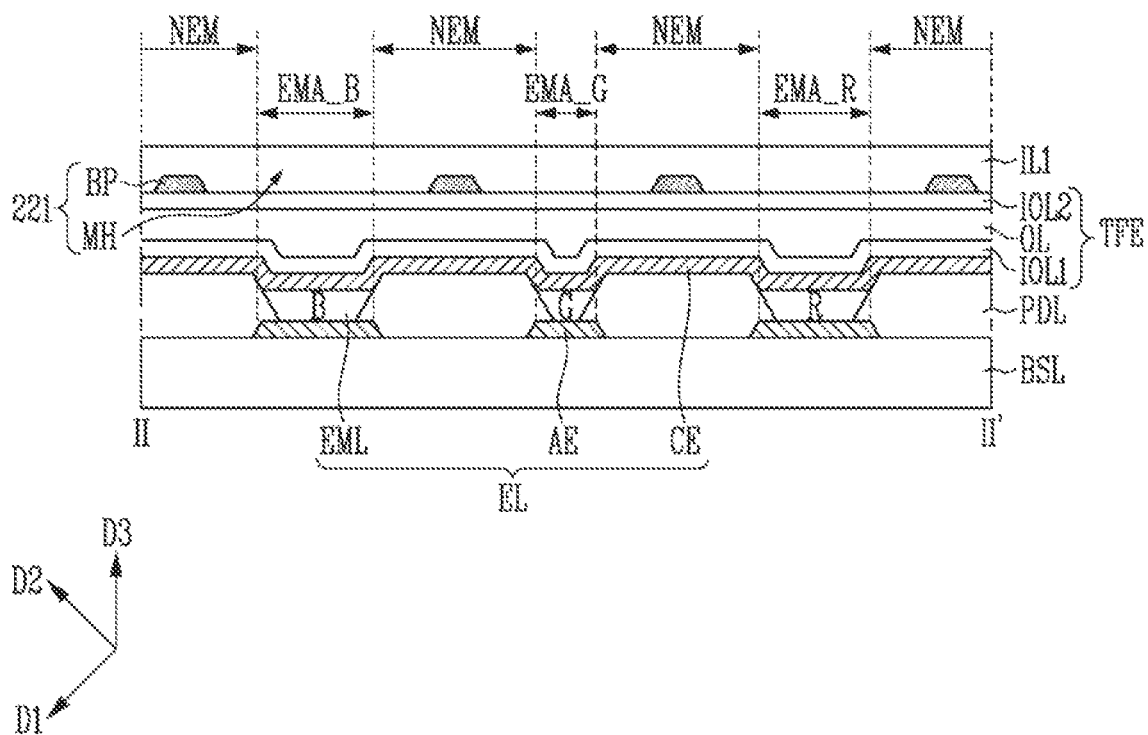
FIG. 11B is a cross-sectional view taken along a line II-II' of FIG. 11A.

FIG. 11B is a cross-sectional view taken along a line II-II' of FIG. 11A.

Referring to FIGS. 10B and 11B, the description of the first sensing cell 211 may be applied to the description of the second sensing cell 221 as a whole. The body portion BP of the second sensing cell 221 may be covered with the first insulating layer IL1. In an embodiment, the body portion BP of the second sensing cell 221 may be disposed on the first insulating layer IL1.

Figure 12:
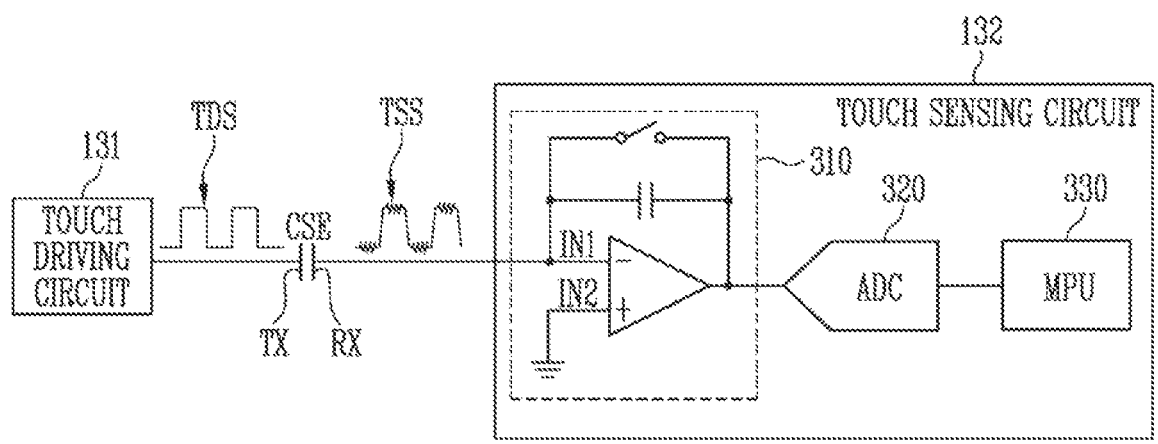
FIG. 12 is a diagram illustrating a touch panel driver of FIG. 1.

FIG. 12 is a diagram illustrating the touch panel driver 130 of FIG. 1.

Referring to FIGS. 1 and 12, the touch panel driver 130 may include a touch driving circuit 131 and a touch sensing circuit 132.

The touch driving circuit 131 may generate the touch driving signal TDS. The touch driving signal TDS may be implemented as a square wave, but according to an embodiment, the touch driving signal TDS may be implemented as a sine wave. The touch driving signal TDS may be input to the first touch electrode TX.

The capacitor CSE (or capacitance) may be formed by the first touch electrode TX and the second touch electrode RX. The touch sensing signal TSS corresponding to the touch driving signal TDS may be output to the second touch electrode RX by the touch driving signal TDS supplied to the first touch electrode TX. The touch sensing signal TSS may be input to the touch sensing circuit 132. The touch sensing circuit 132 may amplify, convert, and perform signal processing on the touch sensing signal TSS input from the second touch electrode RX. The touch sensing circuit 132 may detect whether the touch is input and/or the touch coordinate according to a result of signal processing.

The touch sensing circuit 132 may include a signal receiver 310, an analog digital converter 320 (ADC), a signal processor 330, and the like.

The signal receiver 310 may receive the touch sensing signal TSS from the second touch electrode RX. The signal receiver 310 may amplify and output the touch sensing signal TSS. As an example, the signal receiver 310 may be implemented as an analog front end (AFE) including an operational amplifier (OP-Amp). According to an embodiment, a first input terminal IN1 (for example, an inverting input terminal of the operational amplifier) of the signal receiver 310 may be electrically connected to the second touch electrode RX. A second input terminal IN2 (for example, a non-inverting input terminal of the OP-Amp) of the signal receiver 310 may be electrically connected to a ground terminal. A ground voltage may be input to the second input terminal IN2 of the signal receiver 310.

The ADC 320 may convert an analog signal input from the signal receiver 310 into a digital signal. According to an embodiment, the ADC 320 may be provided as many as the number of second touch electrodes RX to correspond 1:1 to each touch channel corresponding to the second touch electrode RX. According to an embodiment, the ADC 320 may be configured so that the plurality of second touch electrodes RX share one ADC 320. In this case, a switching circuit (for example, a 1:N multiplexer) may be provided between the signal receiver 310 and the ADC 320.

The signal processor 330 may perform signal processing on the signal (e.g., a digital signal) converted by the ADC 320 and detect whether the touch is input and/or the touch coordinate according to the result of the signal processing. As an example, the signal processor 330 may detect whether the touch input is generated and a position thereof by comprehensively analyzing a signal (for example, the amplified and converted touch sensing signal TSS) input from the plurality of first touch electrodes TX via the signal receiver 310 and the ADC 320. According to an embodiment, the signal processor 330 may be implemented as a microprocessor unit (MPU). In this case, a memory used to drive the signal processor 330 may be additionally provided inside the touch sensing circuit 132. However, a configuration of the signal processor 330 is not limited thereto. As another example, the signal processor 330 may be implemented as a microcontroller unit (MCU) or the like.

Figure 13:
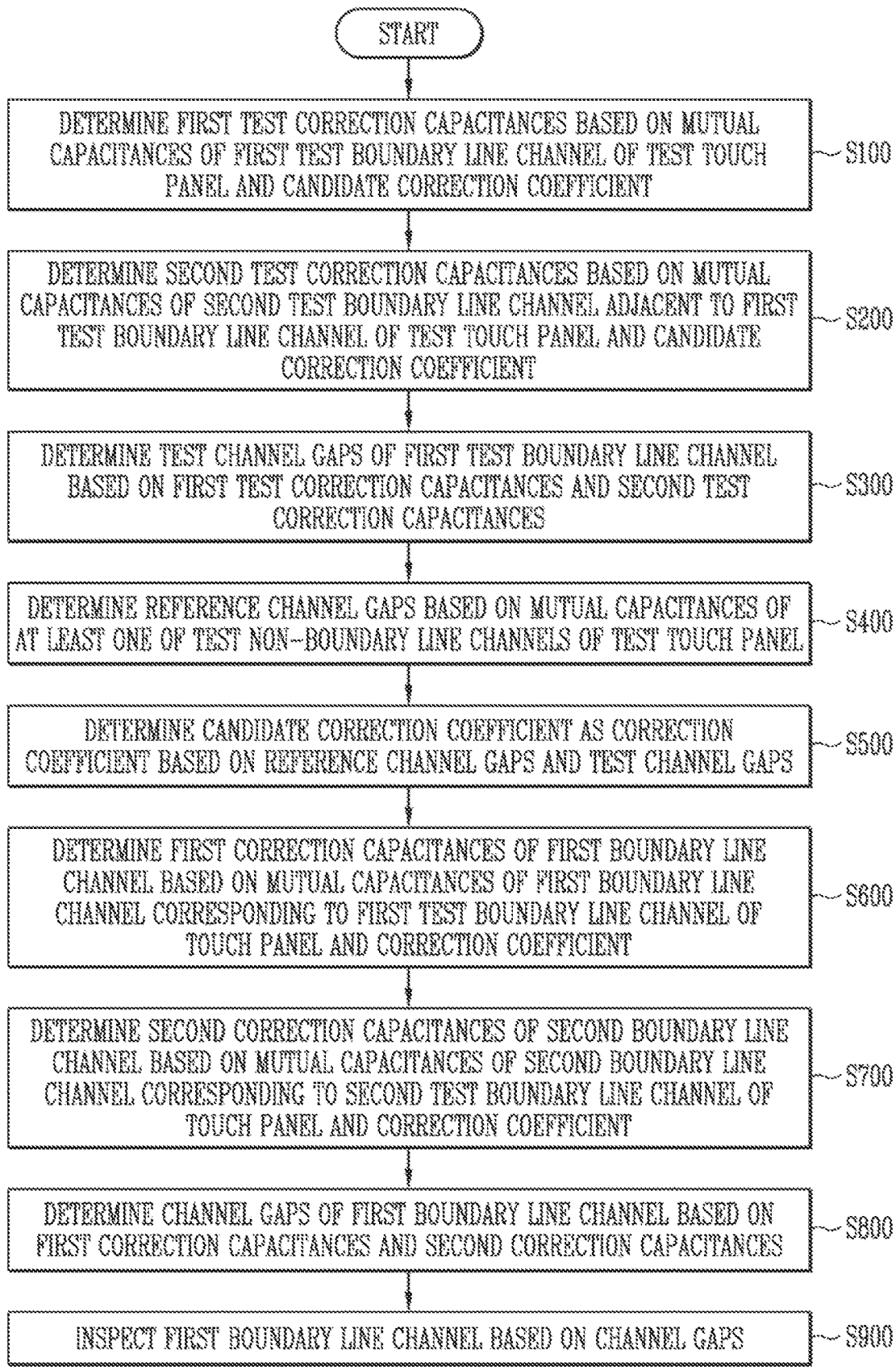
FIG. 13 is a flowchart illustrating a method of inspecting a touch panel according to embodiments of the present disclosure.

FIG. 13 is a flowchart illustrating a method of inspecting a touch panel according to embodiments of the present disclosure.

Referring to FIG. 13, the method of inspecting the touch panel of FIG. 13 may determine first test correction capacitances based on mutual capacitances of a first test boundary line channel of a test touch panel and a candidate correction coefficient (S100), determine second test correction capacitances based on mutual capacitances of a second test boundary line channel adjacent to the first test boundary line channel of the test touch panel and the candidate correction coefficient (S200), determine test channel gaps of the first test boundary line channel based on the first test correction capacitances and the second test correction capacitances (S300), determine reference channel gaps based on mutual capacitances of at least one of test non-boundary line channels of the test touch panel (S400), determine the candidate correction coefficient as a correction coefficient based on the reference channel gaps and the test channel gaps (S500), determine first correction capacitances of a first boundary line channel based on mutual capacitances of the first boundary line channel corresponding to the first test boundary line channel of the touch panel and the correction coefficient (S600), determine second correction capacitances of a second boundary line channel based on mutual capacitances of the second boundary line channel corresponding to the second test boundary line channel of the touch panel and the correction coefficient (S700), determine channel gaps of the first boundary line channel based on the first correction capacitances and the second correction capacitances (S800), and inspecting the first boundary line channel based on the channel gaps (S900).

Steps S600, S700, S800, and S900 of the method of inspecting the touch panel of FIG. 13 may be implemented by the display device 100 of FIG. 1. For example, the touch panel inspector 150 of FIG. 1 may perform steps S600, S700, S800, and S900. However, the present disclosure is not limited thereto. For example, steps S600, S700, S800, and S900 may be performed in a computer device separate from the display device 100 of FIG. 1.

Steps S100, S200, S300, S400, and S500 of the method of inspecting the touch panel of FIG. 13 may be performed using a test touch panel having substantially the same configuration as the touch panel 110 of FIG. 1. For example, the test touch panel may be a golden sample for determining the correction coefficient. In an embodiment, an operation for determining the correction coefficient may be performed through a separate computer device. However, the present disclosure is not limited to a device that performs such an operation.

Hereinafter, the disclosure is specifically described with reference to FIGS. 14 to 22.

Figure 14:
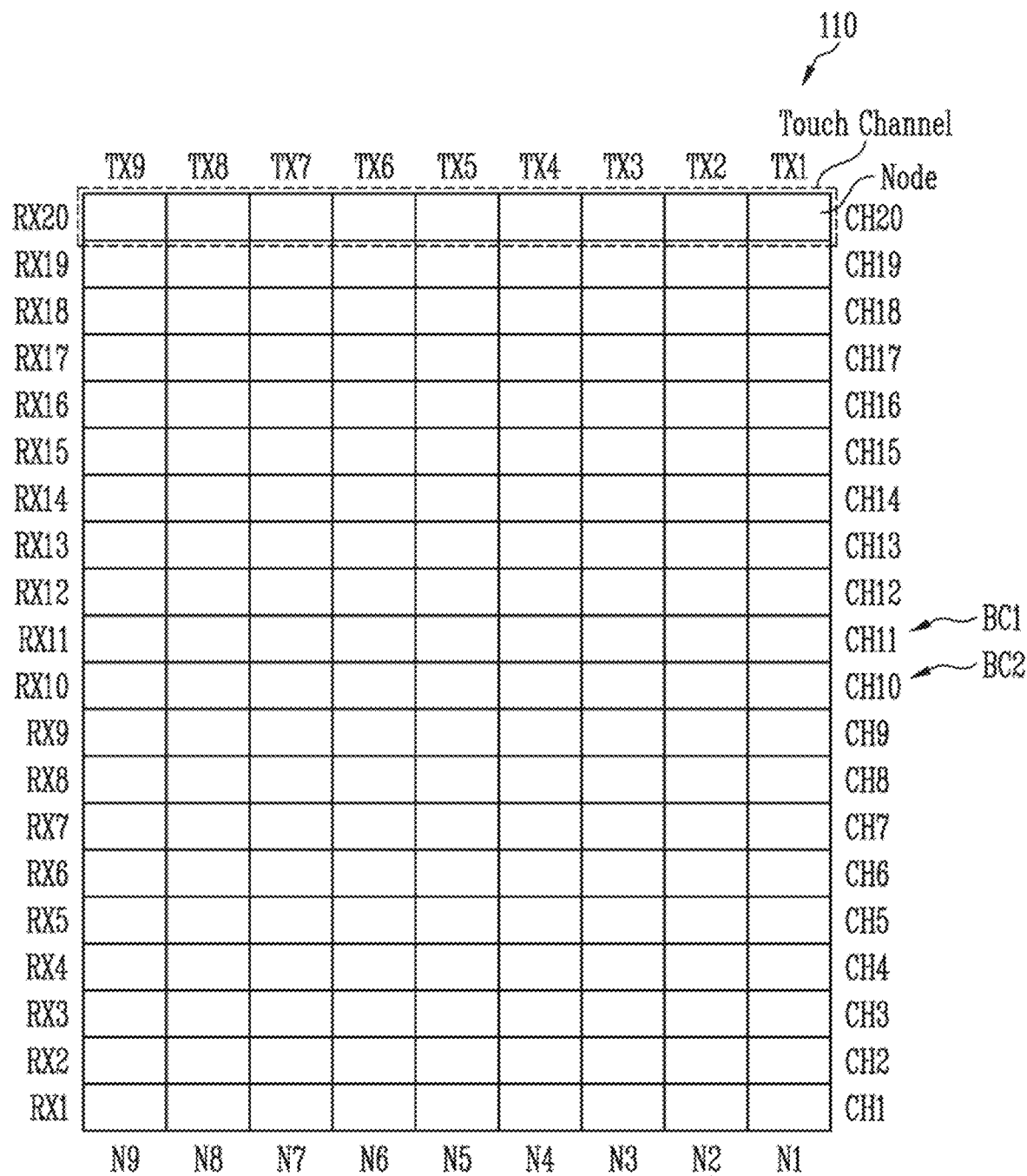
FIG. 14 is a diagram illustrating a touch channel and a node.
Figure 15:
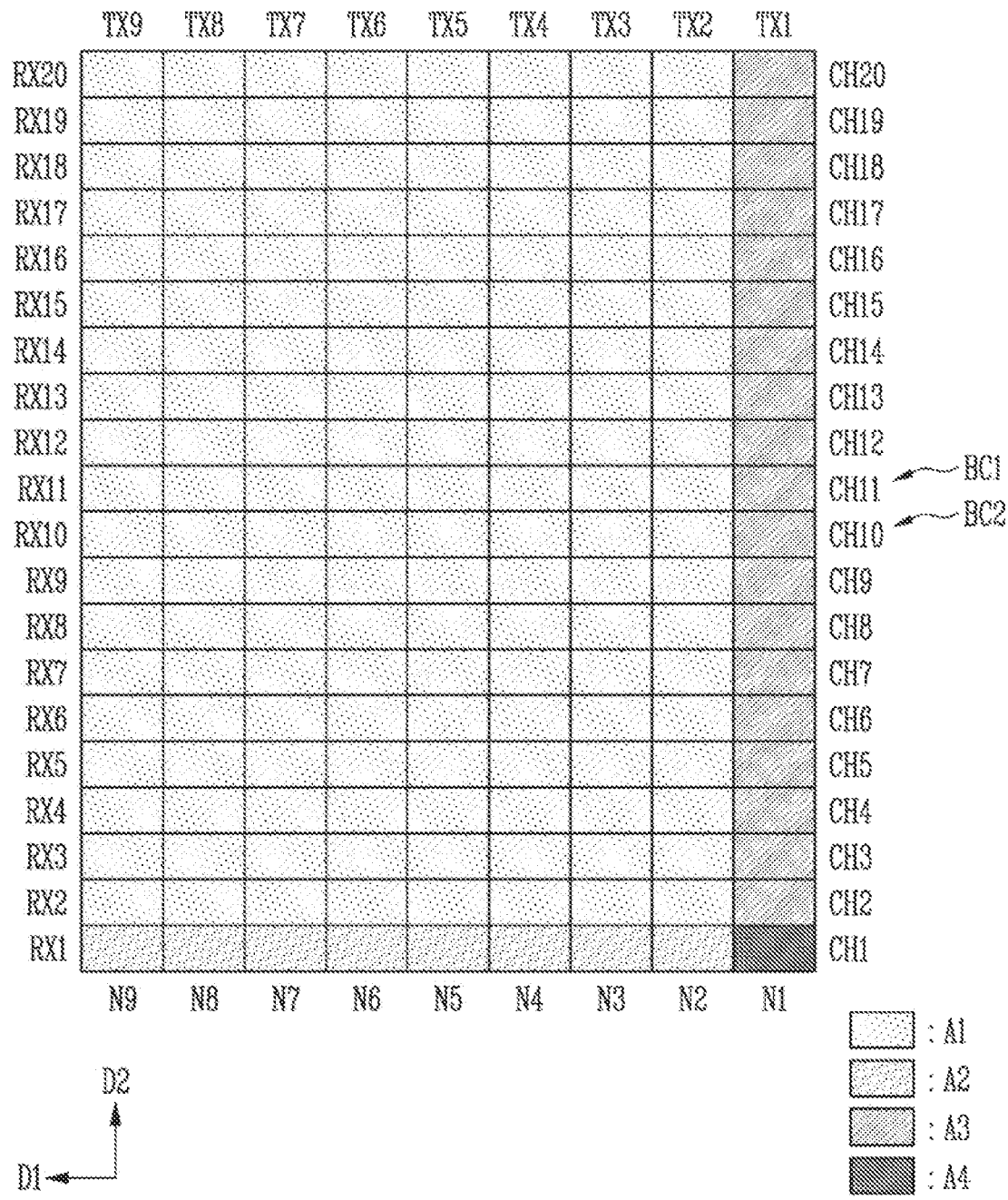
FIG. 15 is a diagram illustrating a method of inspecting channels and nodes.

FIG. 14 is a diagram illustrating touch channels CH1 to CH20 and nodes N1 to N9, and FIG. 15 is a diagram illustrating a method of inspecting the channels CH1 to CH20 and the nodes N1 to N9.

Referring to FIGS. 6 and 14, as described above, one touch channel CH1 to CH20 corresponds to one second touch electrode RX1 to RX20. For example, the touch channel CH1 corresponds to the first touch electrode RX1, the touch channel CH2 corresponds to the second touch electrode RX2, and so forth. In addition, a portion crossing the first touch electrodes TX1 to TX9 in one touch channel CH1 to CH20 corresponds to one node N1 to N9. For example, a portion of the channel CH1 crossing the first touch electrode TX1 corresponds to the node N1, a portion of the channel CH2 crossing the second touch electrode TX22 corresponds to the node N2, and so forth.

A first portion (for example, CH11 to CH20) of the touch channels of the touch panel 110 may be connected to the lines 113 in the first direction D1, and a second portion (for example, CH1 to CH10) of the touch channels different from the first portion may be connected to the lines 113 in a direction opposite to the first direction D1.

The channels CH10 and CH11 of a portion where the first portion and the second portion contact each other may be a first boundary line channel BC1 and a second boundary line channel BC2. For example, the first boundary line channel BC1 may be included in the first portion. For example, the second boundary line channel BC2 may be included in the second portion and may be adjacent to the first boundary line channel BC1.

Referring to FIGS. 1, 6, and 15, a channel gap and/or a node gap may be determined at each of nodes of the touch panel 110.

The channel gap may be determined based on a ratio of mutual capacitances between adjacent touch channels CH1 to CH20. For example, the channel gap may increase as a difference of the mutual capacitances between the adjacent touch channels CH1 to CH20 increases.

For example, a channel gap of the ninth node N9 of the second touch channel CH2 may be calculated using [Equation 1].

$$CHG(CH2, N9) = |(Cm(CH1, N9)/Cm(CH2, N9)) * 100 - 100| \qquad \text{[Equation 1]}$$

Here, CHG(CH2, N9) is the channel gap of the ninth node N9 of the second touch channel CH2, Cm(CH1, N9) is the mutual capacitance of the ninth node N9 of the first touch channel CH1, and Cm(CH2, N9) is the mutual capacitance of the ninth node N9 of the second touch channel CH2.

The node gap may be determined based on a ratio of mutual capacitances between adjacent nodes N1 to N9. For example, the node gap may increase as a difference of the mutual capacitances between the adjacent nodes N1 to N9 increases.

For example, a node gap of the ninth node N9 of the second touch channel CH2 may be calculated using [Equation 2].

$$NG(CH2, N9) = |(Cm(CH2, N10)/Cm(CH2, N9)) * 100 - 100| \qquad \text{[Equation 2]}$$

Here, NG(CH2, N9) is the node gap of the ninth node N9 of the second touch channel CH2, Cm(CH2, N10) is a mutual capacitance of a tenth node N10 of the second touch channel CH2, and Cm(CH2, N9) is a mutual capacitance of the ninth node N9 of the second touch channel CH2.

According to [Equation 1] and [Equation 2], a channel gap of nodes of a second area A2 of the touch panel 110 may not be determined, a node gap of nodes of a third area A3 of the touch panel 110 may not be determined, and a channel gap and a node gap of a node of a fourth area A4 of the touch panel 110 may not be determined. For example, a channel gap and a node gap may be determined at each of nodes of the first area A1 of the touch panel 110. For example, a node gap may be determined at each of nodes of the second area A2 of the touch panel 110. For example, a channel gap may be determined at each of nodes of the third area A3 of the touch panel 110. For example, a channel gap and a node gap may not be determined at a node of the fourth area A4 of the touch panel 110.

When a portion connected to a channel or a node is open, the channel gap or the node gap may have an abnormal value. Accordingly, whether the channel or the node is open may be inspected through the channel gap or the node gap.

In the present embodiment, the channel gap is calculated through channels adjacent in a direction opposite to the second direction D2, and the node gap is calculated through nodes adjacent in the direction opposite to the first direction D1, but the present disclosure is not limited thereto.

In an embodiment, inspection of the touch channels CH1 to CH20 may be performed by the touch panel inspector 150. However, the present disclosure is not limited thereto. For example, the inspection of the touch channels CH1 to CH20 may be performed in a separate computer device.

A resistance at one node among resistances of the nodes N1 to N9 may decrease as the one node is closer to the line 113 connecting the channels CH1 to CH20 and the pad unit 112 of the touch panel 110. In other words, a capacitance at one node among the mutual capacitances may increase as the one node is closer to the line 113 connecting the channels CH1 to CH20 and the pad portion 112 of the touch panel 110.

According to [Equation 1], channel gaps of the first boundary line channel BC1 may be determined through second boundary line channel BC2. However, in the first boundary line channel BC1, the line 113 may be connected in the first direction D1 (e.g., the line 113 may be connected at the left side of the touch panel 110), and in the second boundary line channel BC2, the line 113 may be connected in the direction opposite to the first direction D1 (e.g., the line 113 may be connected at the right side of the touch panel 110). Therefore, the channel gaps of the first boundary line channel BC1 calculated based on the mutual capacitances of the first boundary line channel BC1 and the mutual capacitances of the second boundary line channel BC2 may cause a caustic defect. Accordingly, the method of inspecting the touch panel of FIG. 13 may use the first correction capacitances of the first boundary line channel BC1 and the second correction capacitances of the second boundary line channel BC2 in determining the channel gaps of the first boundary line channel BC1. A detailed description thereof is given later.

Figure 16:
FIG. 16 is a table illustrating an example of mutual capacitances in a first test boundary line channel and a second test boundary line channel of a test touch panel according to the method of inspecting the touch panel of FIG. 13.

FIG. 16 is a table illustrating an example of mutual capacitances Cm in a first test boundary line channel TBC1 and a second test boundary line channel TBC2 of a test touch panel TTP according to the method of inspecting the touch panel of FIG. 13. FIG. 17 is a table illustrating an example of first test correction capacitances TCCm1 and second test correction capacitances TCCm2 according to the method of inspecting the touch panel of FIG. 13.

Values of the mutual capacitances Cm of FIG. 16 and values of the test correction capacitances TCCm1 and TCCm2 of FIG. 17 represent digital values.

Referring to FIGS. 6 and 13, 14, 16, and 17, the method of inspecting the touch panel of FIG. 13 may determine the first test correction capacitances TCCm1 based on the mutual capacitances Cm of the first test boundary line channel TBC1 of the test touch panel TTP and a candidate correction coefficient CCF (S100), and determine the second test correction capacitances TCCm2 based on the mutual capacitances Cm of the second test boundary line channel TBC2 adjacent to the first test boundary line channel TBC1 of the test touch panel TTP and the candidate correction coefficient CCF (S200). In FIG. 17, the candidate correction coefficient CCF is 0.1, but the present disclosure is not limited thereto.

The test touch panel TTP may have substantially the same configuration as the touch panel 110. For example, the test touch panel TTP may be a golden sample for determining a correction coefficient.

The first test boundary line channel TBC1 may correspond to the first boundary line channel BC1 of the touch panel 110. For example, when the eleventh touch channel CH11 of the touch panel 110 is the first boundary line channel BC1, an eleventh touch channel of the test touch panel TTP may be the first test boundary line channel TBC1.

The second test boundary line channel TBC2 may correspond to the second boundary line channel BC2 of the touch panel 110. For example, when the tenth touch channel CH10 of the touch panel 110 is the second boundary line channel BC2, a tenth touch channel of the test touch panel TTP may be the second test boundary line channel TBC2.

The method of inspecting the touch panel of FIG. 13 may calculate an average deviation of the mutual capacitances Cm of the first test boundary line channel TBC1. The average deviation of the first test boundary line channel TBC1 may increase as a difference between a maximum value and a minimum value of the mutual capacitances Cm of the first test boundary line channel TBC1 increases.

For example, the average deviation may be calculated using [Equation 3].

$$AD = (\text{MAXCm} - \text{MINCm})/(\text{NODE} - 1) \qquad \text{[Equation 3]}$$

Here, AD is the average deviation, MAXCm is a maximum mutual capacitance of each touch channel, MINCm is a minimum mutual capacitance of each touch channel, and NODE is the number of nodes of each touch channel.

For example, as shown in FIG. 16, in the first test boundary line channel TBC1, the maximum mutual capacitance is 1660 at node N9, the minimum mutual capacitance is 1500 at node N1, and the number of nodes N1 to N9 is 9. Therefore, the average deviation of the first test boundary line channel TBC1 is 20. For example, the average deviation may correspond to the difference in mutual capacitance between adjacent nodes (e.g., 1520 at node N2 minus 1500 at node N1, or 1540 at N3 minus 1520 at N2).

In an embodiment, in [Equation 3], a mutual capacitance of a node closest to a line (for example, the ninth node N9 of the first test boundary line channel TBC1) may be used instead of the maximum mutual capacitance. In an embodiment, in [Equation 3], a mutual capacitance of a node farthest from the line (for example, the first node N1 of the first test boundary line channel TBC1) may be used instead of the minimum mutual capacitance.

The method of inspecting the touch panel of FIG. 13 may determine a test correction deviation TCD by multiplying the average deviation by the candidate correction coefficient CCF, and determine the first test correction capacitances TCCm1 based on the average value AV of the mutual capacitances Cm of the first test boundary line channel TBC1 and the test correction deviation TCD. A capacitance at one node among the first test compensation capacitances TCCm1 may increase as the one node is closer to a line connecting the first test boundary line channel TBC1 and a pad unit of the test touch panel TTP.

The candidate correction coefficient CCF may have a value between 0 and 1. The method of inspecting the touch panel of FIG. 13 may determine any one of the candidate correction coefficients CCF as the correction coefficient. To accomplish this, the first test correction capacitances TCCm1 and the second test correction capacitances TCCm2 may be calculated using one of the candidate correction coefficients CCF.

FIG. 17 illustrates that 0.1 of the candidate correction coefficients CCF is used for convenience of description.

For example, as shown in FIGS. 16 and 17, the average deviation of the first test boundary line channel TBC1 may be 20, and the test correction deviation TCD may be 2 (20*0.1=2). The first test correction capacitance TCCm1 of the intermediate node (for example, the fifth node N5) may be 1580, which is the average value AV of the mutual capacitances Cm of the first test boundary line channel TBC1. The first test correction capacitance TCCm1 of the node closest to the line 113 (for example, the ninth node N9) may be 1588 (1580+2*4=1588) obtained by adding 8, which is four times the test correction deviation TCD of 2, to the average value AV of the mutual capacitances Cm of the first test boundary line channel TBC1 (i.e., 1580). The first test correction capacitance TCCm1 of the node farthest from the line 113 (for example, the first node N1) may be 1572 (1580−2*4=1572) obtained by subtracting 8, which is four times the test correction deviation TCD of 2, from the average value AV of the mutual capacitances Cm of the first test boundary line channel TBC1 (i.e., 1580).

Since the second test correction capacitances TCCm2 are calculated in substantially the same method as the first test correction capacitances TCCm1, an overlapping description is omitted.

However, the present disclosure is not limited to a coefficient multiplied by the test correction deviation TCD.

FIG. 18 is a table illustrating an example of the first test correction capacitances TCCm1 and the second test correction capacitances TCCm2 according to the method of inspecting the touch panel of FIG. 13. Differently from FIG. 17, FIG. 18 illustrates that the number of nodes N1 to N8 is even, and the average deviation of the first test boundary line channel TBC1 is 40.

Referring to FIG. 18, the average deviation of the first test boundary line channel TBC1 may be 40, and the test correction deviation TCD may be 4 (40*0.1=4). The first test correction capacitance TCCm1 of the fifth node N5 among the intermediate nodes may be 1582 (1580+4*0.5=1582) obtained by adding 2, which is 0.5 times the test correction deviation TCD of 4, to the average value AV of the mutual capacitances Cm of the first test boundary line channel TBC1 (i.e., 1580). The first test correction capacitance TCCm1 of the fourth node N4 among the intermediate nodes may be 1578 (1580−4*0.5=1578) obtained by subtracting 2, which is 0.5 times the test correction deviation TCD of 4, from the average value AV of the mutual capacitances Cm of the first test boundary line channel TBC1 (i.e., 1580).

FIG. 19 is a table illustrating the first test correction capacitances TCCm1 and the second test correction capacitances TCCm2 according to a method of inspecting a touch panel according to embodiments of the disclosure.

Since the method of inspecting the touch panel according to the present embodiments is substantially the same as the method of inspecting the touch panel of FIG. 13 except for using the mutual capacitance Cm of the intermediate node instead of the average value AV, the same reference numerals and reference symbols are used for the same or similar components, and an overlapping description is thus omitted.

Referring to FIGS. 16 and 19, the method of inspecting the touch panel of FIG. 19 may calculate the average deviation of the mutual capacitances Cm of the first test boundary line channel TBC1, determine the test correction deviation TCD by multiplying the average deviation by the candidate correction coefficient, and determine the first test correction capacitances TCCm1 based on the mutual capacitance Cm of the intermediate node (for example, the fifth node N5) among the mutual capacitances Cm of the first test boundary line channel TBC1, and the test correction deviation TCD.

For example, as shown in FIGS. 16 and 19, the average deviation of the first test boundary line channel TBC1 may be 20, and the test correction deviation TCD may be 2 (20*0.1=2). The first test correction capacitance TCCm1 of the node closest to the line 113 (for example, the ninth node N9) may be 1588 (1580+2*4=1588) obtained by adding 8, which is four times the test correction deviation TCD, to the mutual capacitance Cm of the intermediate node (for example, the fifth node N5). The first test correction capacitance TCCm1 of the node farthest from the line 113 (for example, first node N1) may be 1572 (1580−2*4=1572) obtained by subtracting 8, which is four times the test correction deviation TCD, from the mutual capacitance Cm of the intermediate node (for example, the fifth node N5).

In an embodiment, when the number of nodes is even, the first test correction capacitances TCCm1 may be determined based on the mutual capacitance Cm of any one of the intermediate nodes.

FIG. 20 is a table illustrating an example of determining a correction coefficient CF according to the method of inspecting the touch panel of FIG. 13.

Referring to FIGS. 13, 14, 16, 17, and 20, the method of inspecting the touch panel of FIG. 13 may determine test channel gaps TCG of the first test boundary line channel TBC1 based on the first test correction capacitances TCCm1 and the second test correction capacitances TCCm2 (S300).

The test channel gaps TCG may be determined based on a ratio of the first test correction capacitances TCCm1 and the second test correction capacitances TCCm2 at each of the nodes N1 to N9. For example, the test channel gaps TCG may increase as a difference between the first test correction capacitances TCCm1 and the second test correction capacitances TCCm2 of each of the node N1 to N9 increases.

The test channel gaps TCG may be calculated in substantially the same method as the channel gap described with reference to [Equation 1], except that the first test correction capacitances TCCm1 and the second test correction capacitances TCCm2 are used.

For example, the test channel gap TCG of the ninth node N9 of the first boundary line channel TBC1 may be calculated using [Equation 4].

$$TCG(N9) = |(TCCm2(N9)/TCCm1(N9)) * 100 - 100| \quad \text{[Equation 4]}$$

Here, TCG (N9) is the test channel gap of the ninth node N9 of the first test boundary line channel TBC1, TCCm2 (N9) is the second test correction capacitance TCCm2 of the ninth node (N9), and TCCm1 (N9) is the first test correction capacitance TCCm1 of the ninth node N9.

The method of inspecting the touch panel of FIG. 13 may determine reference channel gaps RCG based on mutual capacitances Cm of at least one of test non-boundary line channels TNBC of the test touch panel TTP (S400).

In an embodiment, the non-boundary line channels TNBC may be test touch channels except for the first test boundary line channel TBC1 and the second test boundary line channel TBC2 among test touch channels of the test touch panel TTP. For example, with reference to FIG. 14, the non-boundary line channels TNBC may be any of channels CH1 to CH9 and CH12 to CH20. In an embodiment, the non-boundary line channels TNBC may be test touch channels except for the first test boundary line channel TBC1 among the test touch channels of the test touch panel TTP. In this case, with reference to FIG. 14, the non-boundary line channels TNBC may be any of channels CH1 to CH10 and CH12 to CH20. The test touch channels of the test touch panel TTP may correspond to the touch channels CH1 to CH20 of the touch panel 110.

The reference channel gaps RCG may be determined based on a ratio of the mutual capacitances Cm between adjacent non-boundary line channels TNBC at each of the nodes N1 to N9. The reference channel gaps RCG may increase as a difference of the mutual capacitances Cm between the adjacent non-boundary line channels TNBC in each of the nodes N1 to N9 increases.

In an embodiment, an average value of channel gaps of the non-boundary line channels TNBC at each of the nodes N1 to N9 may be calculated. In addition, the average value at each of the nodes N1 to N9 may be determined as the reference channel gaps RCG at each of the nodes N1 to N9. The channel gaps of the non-boundary line channels TNBC may be calculated in substantially the same method as the channel gap described with reference to [Equation 1].

In an embodiment, any one test touch channel among the non-boundary line channels TNBC may be selected. In addition, channel gaps of the selected test touch channel may be determined as the reference channel gaps RCG. The channel gaps of the selected test touch channel may be calculated in substantially the same method as the channel gap described with reference to [Equation 1].

The method of inspecting the touch panel of FIG. 13 may determine the candidate correction coefficient CCF as the correction coefficient CF based on the reference channel gaps RCG and the test channel gaps TCG (S500). The candidate correction coefficient CCF may be determined as the correction coefficient CF when the average value of the test channel gaps TCG is less than the average value of the reference channel gaps RCG.

For example, as shown in FIG. 20, when the candidate correction coefficient CCF is 0.1 to 0.3, the average value of the test channel gaps TCG may be less than the average value of the reference channel gaps RCG. Accordingly, any one of 0.1, 0.2, and 0.3 may be determined as the correction coefficient CF.

FIG. 21 is a table illustrating that a correction coefficient CF is determined according to a method of inspecting a touch panel according to embodiments of the present disclosure.

Since the method of inspecting the touch panel according to the present embodiments is substantially the same as a configuration of the method of inspecting the touch panel of FIG. 13 except for comparing a maximum value of the test channel gaps TCG and a maximum value of the reference channel gaps RCG, the same reference numerals and reference symbols are used for the same or similar components, and an overlapping description is thus omitted.

Referring to FIG. 21, the candidate correction coefficient CCF may be determined as the correction coefficient CF when the maximum value of the test channel gaps TCG is less than the maximum value of the reference channel gaps RCG.

For example, as shown in FIG. 21, when the candidate correction coefficient CCF is 0.1, the maximum value of the test channel gaps TCG may be less than the maximum value of the reference channel gaps RCG. Accordingly, 0.1 may be determined as the correction coefficient CF.

FIG. 22 is a table illustrating an example of determining the channel gaps CHG of the first boundary line channel BC1 according to the method of inspecting the touch panel of FIG. 13.

Referring to FIGS. 6, 13, 14, and 22, the method of inspecting the touch panel of FIG. 13 may determine the first correction capacitances CCm1 of the first boundary line channel BC1 based on the mutual capacitances Cm of the first boundary line channel BC1 of the touch panel 110 and the correction coefficient CF (S600), and determine the second correction capacitances CCm2 of the second boundary line channel BC2 based on the mutual capacitances Cm of the second boundary line channel BC2 of the touch panel 110 and the correction coefficient CF (S700).

The method of inspecting the touch panel of FIG. 13 may calculate an individual deviation ND at each of the nodes N1 to N9 for the mutual capacitances Cm of the first boundary line channel BC1. The individual deviation ND may increase as the nodes N1 to N9 are close to the line 113 connecting the first boundary line channel BC1 and the pad unit 112 of the touch panel 110.

For example, the individual deviation ND may be a difference of the mutual capacitances Cm at each of the nodes N1 to N9 of the touch channels N1 to N9 and an average value Cm_Avg of the mutual capacitances Cm of the touch channels CH1 to CH20. For example, a difference between 1660, which is the mutual capacitance Cm of the ninth node N9, and 1580, which is the average value Cm_Avg of the mutual capacitances Cm of the first boundary line channel BC1, may be 80. Accordingly, the individual deviation ND of the ninth node N9 of the first boundary line channel BC1 may be 80.

Since the individual deviation ND of the second boundary line channel BC2 may be calculated in substantially the same method as the individual deviation ND of the first boundary line channel BC1, an overlapping description is thus omitted.

The method of inspecting the touch panel of FIG. 13 may determine the correction deviation CD by multiplying the individual deviation ND by the correction coefficient CF. For example, the correction deviation CD of the ninth node N9 of the first boundary line channel BC1 may be 8, which is a multiplication of 80, which is the individual deviation ND, and 0.1, which is the correction coefficient CF.

Since the correction deviation CD of the second boundary line channel BC2 may be calculated in substantially the same method as the correction deviation CD of the first boundary line channel BC1, an overlapping description is thus omitted.

The method of inspecting the touch panel of FIG. 13 may determine the first correction capacitances CCm1 based on the average value Cm_Avg of the mutual capacitances Cm of the first boundary line channel BC1 and the correction deviation CD. The first correction capacitance CCm1 at each of the nodes N1 to N9 may be calculated by adding the correction deviation CD in each of the nodes N1 to N9 and the average value Cm_Avg of the mutual capacitances Cm of the first boundary line channel BC1. For example, the first correction capacitance CCm1 at the node N9 may be determined by adding the correction deviation CD of 8 to the average value Cm_Avg of 1580 to obtain 1588. Similarly, the first correction capacitance CCm1 at the node N1 may be determined by adding the correction deviation CD of −8 to the average value Cm_Avg of 1580 to obtain 1572.

Since the second correction capacitance CCm2 is calculated in substantially the same method as the first correction capacitance CCm1, an overlapping description is thus omitted.

The method of inspecting the touch panel of FIG. 13 may determine the channel gaps CHG of the first boundary line channel BC1 based on the first correction capacitances CCm1 and the second correction capacitances CCm2 (S800).

The channel gaps CHG of the first boundary line channel BC1 may be determined based on a ratio at each of the nodes N1 to N9 of the first correction capacitances CCm1 and the second correction capacitances CCm2. The channel gaps CHG of the first boundary line channel BC1 may increase as a difference between the first correction capacitances CCm1 and the second correction capacitances CCm2 of each of the nodes N1 to N9 increases.

The channel gaps CHG of the first boundary line channel BC1 may be calculated in substantially the same method as the channel gap described with reference to [Equation 1] except for using the first correction capacitances CCm1 and the second correction capacitances CCm2.

The first boundary line channel BC1 may be inspected based on the channel gaps CHG of the first boundary line channel BC1. As described above, the channel gaps of the first boundary line channel BC1 calculated based on the mutual capacitances Cm of the first boundary line channel BC1 and the mutual capacitances Cm of the second boundary line channel BC2 may cause the caustic defect. Therefore, to prevent the caustic defect, the method of inspecting the touch panel of FIG. 13 may inspect the first boundary line channel BC1 using the channel gaps CHG of the first boundary line channel BC1 calculated based on the first correction capacitances CCm1 and the second correction capacitances CCm2.

When a portion of the first boundary line channel BC1 is open, the channel gaps CHG of the first boundary line channel BC1 may have an abnormal value. Accordingly, whether the first boundary line channel BC1 is open may be inspected through the channel gaps CHG of the first boundary line channel BC1.

The present disclosure may be applied to a display device and an electronic device including the display device. For example, the present disclosure may be applied to a digital TV, a three-dimensional (3D) TV, a mobile phone, a smart phone, a tablet computer, a virtual reality (VR) device, a personal computer (PC), a home electronic device, a notebook computer, a personal digital assistant (PDA), a portable media player (PMP), a digital camera, a music player, a portable game console, a navigation system, and the like.

Although the present disclosure has been described with reference to the above embodiments, it will be understood that those skilled in the art can variously modify and change the embodiments without departing from the spirit and scope of the present disclosure set forth in the claims below.

What is claimed is:

1. A method of inspecting a touch panel, the method comprising:
   determining first test correction capacitances based on mutual capacitances of a first test boundary line channel of a test touch panel and a candidate correction coefficient;
   determining second test correction capacitances based on mutual capacitances of a second test boundary line channel of the test touch panel and the candidate correction coefficient, wherein the second test boundary line channel is adjacent to the first test boundary line channel;
   determining test channel gaps of the first test boundary line channel based on the first test correction capacitances and the second test correction capacitances;
   determining reference channel gaps based on mutual capacitances of at least one of a plurality of test non-boundary line channels of the test touch panel;
   determining the candidate correction coefficient as a correction coefficient based on the reference channel gaps and the test channel gaps;
   determining first correction capacitances of a first boundary line channel of the touch panel based on mutual capacitances of the first boundary line channel and the correction coefficient, wherein the first boundary line channel corresponds to the first test boundary line channel;
   determining second correction capacitances of a second boundary line channel of the touch panel based on mutual capacitances of the second boundary line channel, wherein the second boundary line channel corresponds to the second test boundary line channel;
   determining channel gaps of the first boundary line channel based on the first correction capacitances and the second correction capacitances; and
   inspecting the first boundary line channel based on the channel gaps.

2. The method according to claim 1, wherein a first portion of touch channels of the touch panel is connected to first lines in a first direction,
   a second portion of the touch channels different from the first portion is connected to second lines in a direction opposite to the first direction,
   the first boundary line channel is included in the first portion, and
   the second boundary line channel is included in the second portion and is adjacent to the first boundary line channel.

3. The method according to claim 1, wherein determining the first test correction capacitances comprises:
   calculating an average deviation of the mutual capacitances of the first test boundary line channel;
   determining a test correction deviation by multiplying the average deviation by the candidate correction coefficient; and
   determining the first test correction capacitances based on an average value of the mutual capacitances of the first test boundary line channel and the test correction deviation.

4. The method according to claim 3, wherein the average deviation of the mutual capacitances of the first test boundary line channel increases as a difference between a maximum value and a minimum value of the mutual capacitances of the first test boundary line channel increases.

5. The method according to claim 3, wherein a first test correction capacitance at a node among the first test correction capacitances increase as the one node gets closer to a line connecting the first test boundary line channel to a pad unit of the test touch panel.

6. The method according to claim 1, wherein determining the first test correction capacitances comprises:
   calculating an average deviation of the mutual capacitances of the first test boundary line channel;

determining a test correction deviation by multiplying the average deviation by the candidate correction coefficient; and determining the first test correction capacitances based on a mutual capacitance of an intermediate node among the mutual capacitances of the first test boundary line channel and the test correction deviation.

7. The method according to claim 1, wherein the test channel gaps are determined based on a ratio of the first test correction capacitances and the second test correction capacitances at each node.

8. The method according to claim 1, wherein the test channel gaps increase as a difference between the first test correction capacitances and the second test correction capacitances at each node increases.

9. The method according to claim 1, wherein the reference channel gaps are determined based on a ratio at each node of the mutual capacitances between the adjacent non-boundary line channels.

10. The method according to claim 1, wherein the reference channel gaps increase as a difference of the mutual capacitances between the adjacent non-boundary line channels at each node increases.

11. The method according to claim 1, wherein the candidate correction coefficient is determined as the correction coefficient when an average value of the test channel gaps is less than an average value of the reference channel gaps.

12. The method according to claim 1, wherein the candidate correction coefficient is determined as the correction coefficient when a maximum value of the test channel gaps is less than a maximum value of the reference channel gaps.

13. The method according to claim 1, wherein determining the first correction capacitances comprises:

calculating an individual deviation at each node of the mutual capacitances of the first boundary line channel;

determining a correction deviation by multiplying the individual deviation by the correction coefficient; and determining the first correction capacitances based on an average value of the mutual capacitances of the first boundary line channel and the correction deviation.

14. The method according to claim 13, wherein the individual deviation increases as the nodes get closer to a line connecting the first boundary line channel to a pad unit of the touch panel.

15. The method according to claim 1, wherein determining the first correction capacitances comprises:

calculating an individual deviation at each node of the mutual capacitances of the first boundary line channel;

determining a correction deviation by multiplying the individual deviation by the correction coefficient; and determining the first correction capacitances based on a mutual capacitance of an intermediate node among the mutual capacitances of the first boundary line channel and the correction deviation.

16. The method according to claim 1, wherein the channel gaps are determined based on a ratio at each node of the first correction capacitances and the second correction capacitances.

17. The method according to claim 1, wherein the channel gaps increase as a difference between the first correction capacitances and the second correction capacitances at each node increases.

18. A display device comprising:

a touch panel including touch channels; a touch panel driver configured to drive the touch panel; and a plurality of lines connected to a first portion of the touch channels in a first direction, connected to a second portion different from the first portion among the touch channels in a direction opposite to the first direction, and connecting the touch channels to the touch panel driver, wherein the device determines first correction capacitances of a first boundary line channel, which is included in the first portion, based on mutual capacitances of the first boundary line channel and a correction coefficient, determines second correction capacitances of a second boundary line channel, which is included in the second portion and is adjacent to the first boundary line channel, based on mutual capacitances of the second boundary line channel and the correction coefficient, and determines channel gaps of the first boundary line channel based on the first correction capacitances and the second correction capacitances.

19. The display device according to claim 18, wherein the display device calculates an individual deviation at each node of the mutual capacitances of the first boundary line channel, determines a correction deviation by multiplying the individual deviation by the correction coefficient, and determines the first correction capacitances based on an average value of the mutual capacitances of the first boundary line channel and the correction deviation.

20. The display device according to claim 18, wherein the channel gaps are determined based on a ratio at each node of the first correction capacitances and the second correction capacitances.

* * * * *